US005492082A

United States Patent [19]
Krevinghaus et al.

[11] Patent Number: 5,492,082
[45] Date of Patent: Feb. 20, 1996

[54] METHOD AND APPARATUS FOR CONTROLLING TEMPERATURE WITHIN POULTRY HOUSES AND THE LIKE

[75] Inventors: Robert E. Krevinghaus, Pierceton; William M. Smith, Jr., Corunna; George Strohschein, Akron; Ray E. Swartzendruber, Syracuse, all of Ind.

[73] Assignee: CTB Inc., Milford, Ind.

[21] Appl. No.: 183,125

[22] Filed: Jan. 18, 1994

[51] Int. Cl.⁶ ................................................. A01K 31/00
[52] U.S. Cl. ........................................ 119/21; 236/49.3
[58] Field of Search .................... 119/16, 21, 22; 454/233, 239; 236/49.3

[56] References Cited

U.S. PATENT DOCUMENTS

| | | |
|---|---|---|
| 2,489,515 | 11/1949 | Blake et al. . |
| 2,995,077 | 8/1961 | Kitson . |
| 3,000,290 | 9/1961 | Rodick et al. . |
| 3,285,153 | 11/1966 | Hartsough . |
| 3,915,377 | 10/1975 | Sutton, Jr. . |
| 4,113,175 | 9/1978 | Sutton, Jr. . |
| 4,184,538 | 1/1980 | Rauenhorst . |
| 4,428,278 | 1/1984 | Sutton, Jr. . |
| 4,602,739 | 7/1986 | Sutton, Jr. . |
| 4,773,471 | 9/1988 | Grant et al. .................... 119/21 X |
| 4,776,385 | 10/1988 | Dean . |
| 4,986,469 | 1/1991 | Sutton, Jr. . |
| 5,193,483 | 3/1993 | Crider et al. ....................... 119/16 |
| 5,205,785 | 4/1993 | Richardson et al. ............. 454/239 X |
| 5,336,131 | 8/1994 | Crider et al. ..................... 236/49.3 X |

OTHER PUBLICATIONS

Aerotech, "Environmental Computer Control Systems", undated.
Hired–Hand Mfg., Inc. reference: "Check Out Our 3 New Curtain Controllers?"Hired–Hand Mfg., Inc. reference: "System 1000 Power Curtain" (Jan. 1992).
Hired–Hand Mfg., Inc. reference: "Super Saver XL" (Sep. 1992).
Hired–Hand Mfg., Inc. reference: "Super Saver" (Dec. 1991).
Hired–Hand Mfg., Inc. reference: "VSC 1000" (Oct. 1992).
Hired–Hand Mfg., Inc. reference: "Auto Temp" (Jul. 1992).
Hired–Hand Mfg., Inc. reference: "8–Stage Curtain & Ventilation Control" (Nov. 1991).
Hired–Hand Mfg., Inc. reference: "System 1000 Power Vent" (Dec. 1992).
Hired–Hand Mfg., Inc. reference: "Power Curtain" (Jul. 1992).
Hired–Hand Mfg., Inc. reference: "Curt–O–Matic" (Sep. 1992).

*Primary Examiner*—Robert P. Swiatek
*Attorney, Agent, or Firm*—Harness, Dickey & Pierce

[57] ABSTRACT

A facility for housing animals such as poultry in a well-ventilated and temperature controlled environment. The facility includes an electronic temperature controller system for providing manual control, as well as programmed operation, over a plurality of side wall curtains, a plurality of tunnel curtains, a plurality of side wall exhaust fans and a plurality of tunnel fans. The system enables the user to instantly visually check the status of, and program operation of, each of these devices by providing a plurality of independent switch controls and indicia for each such device associated with the facility. In alternative embodiments a plurality of heater control switches are included as well as a plurality of auxiliary switch controls for controlling a plurality of optional stir fans. The user is afforded the capability of quickly and easily checking the status of, or programming, the operation of each and every cooling device associated with the facility without resort to computer keyboards or scrolling through numerous menus of menu-driven software systems.

45 Claims, 9 Drawing Sheets

FIG. 1

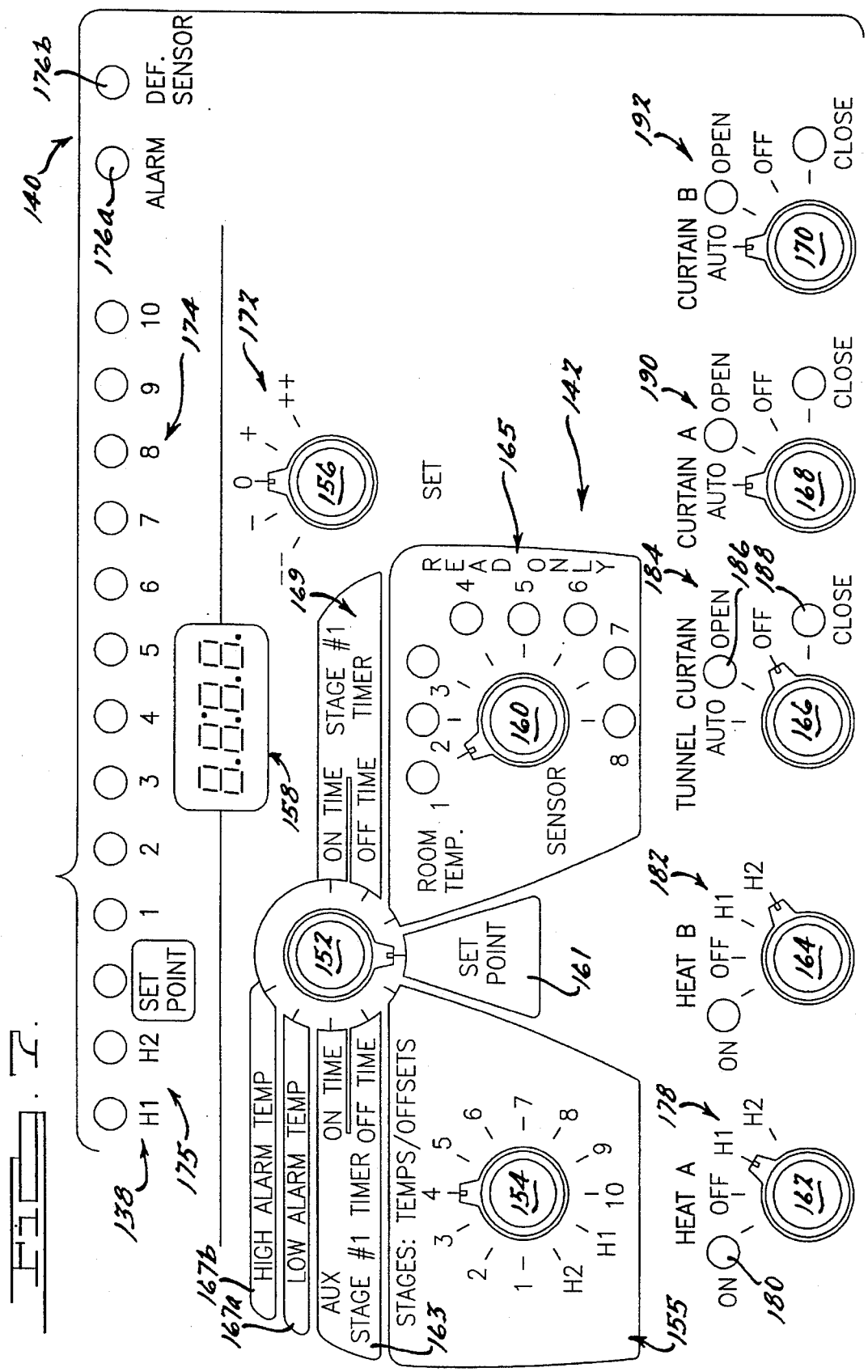

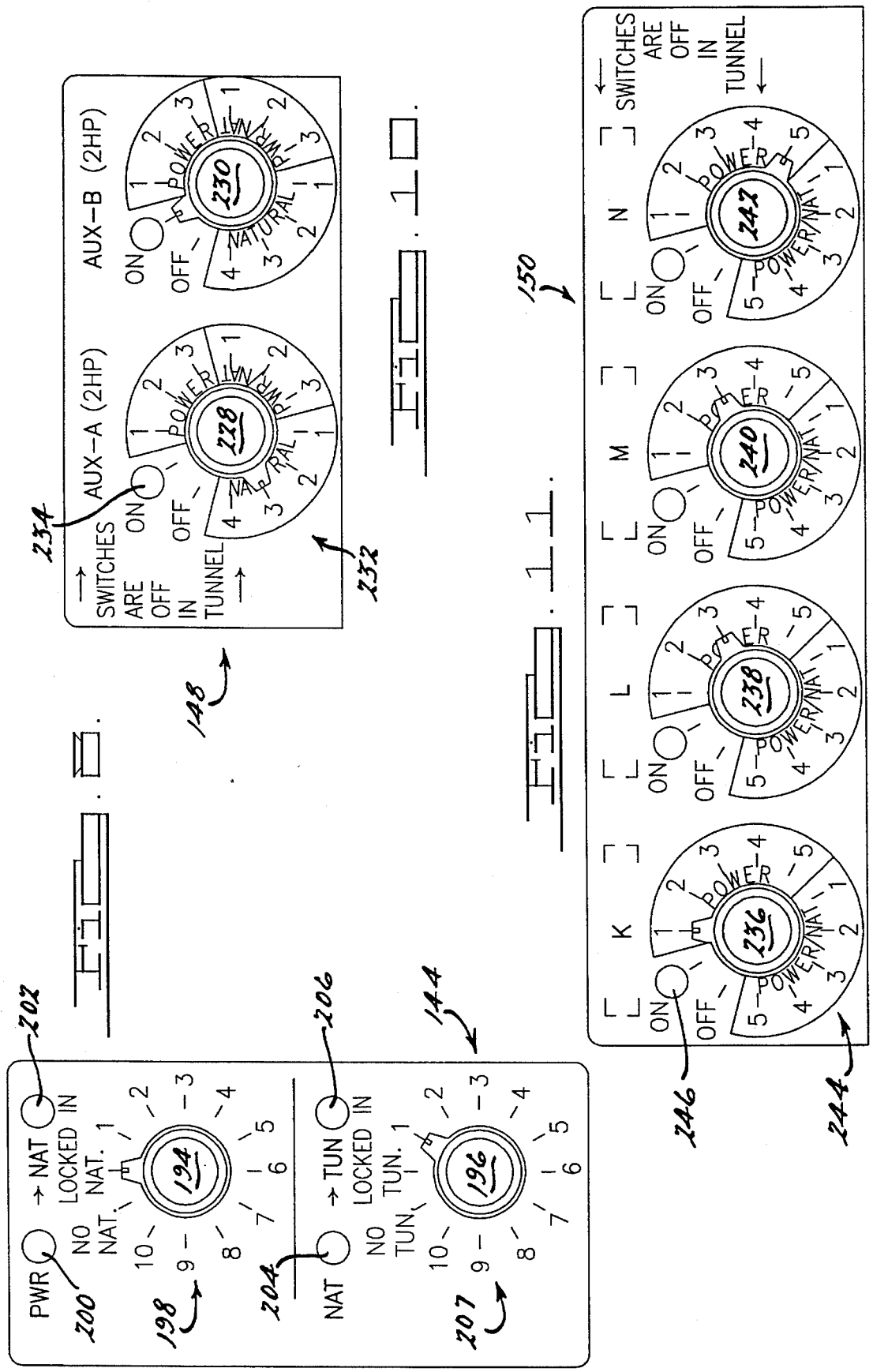

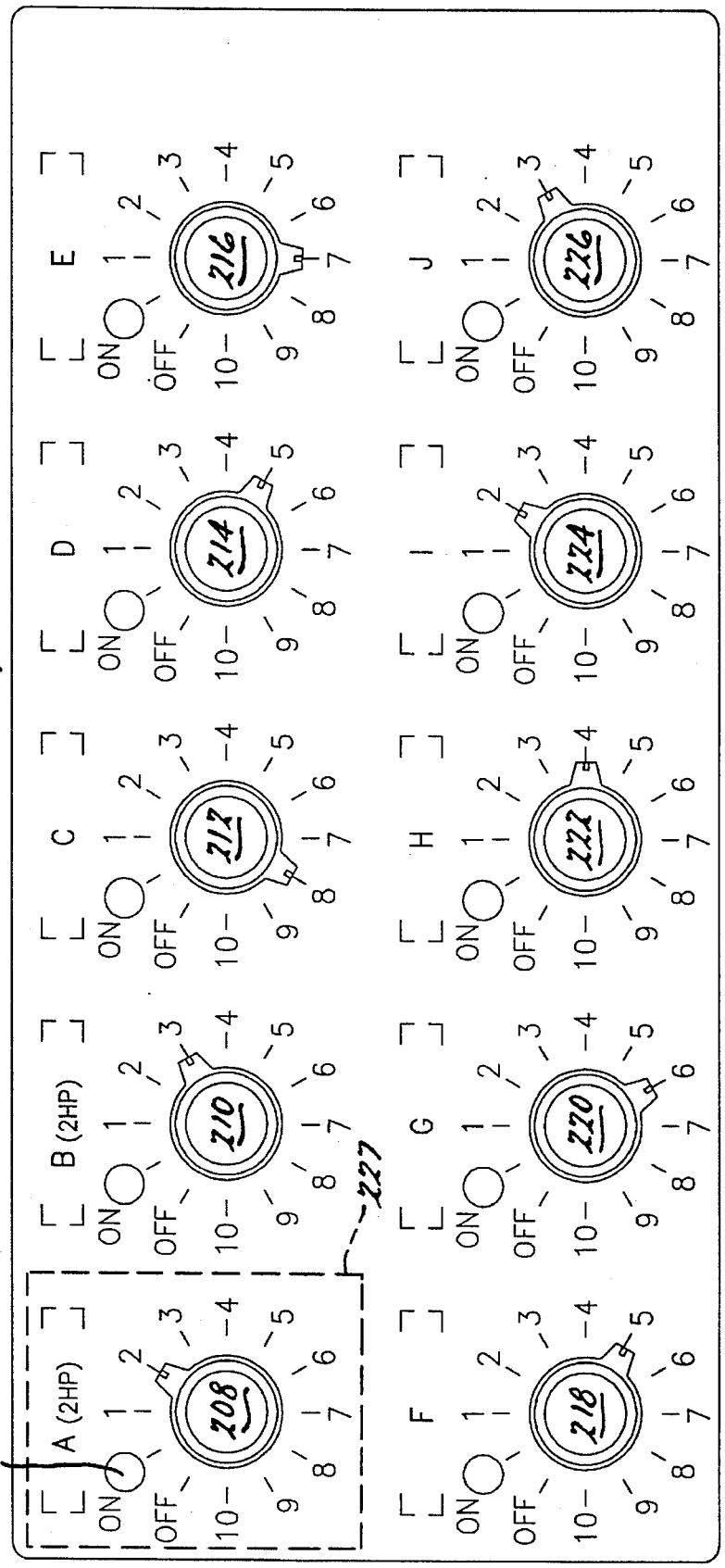

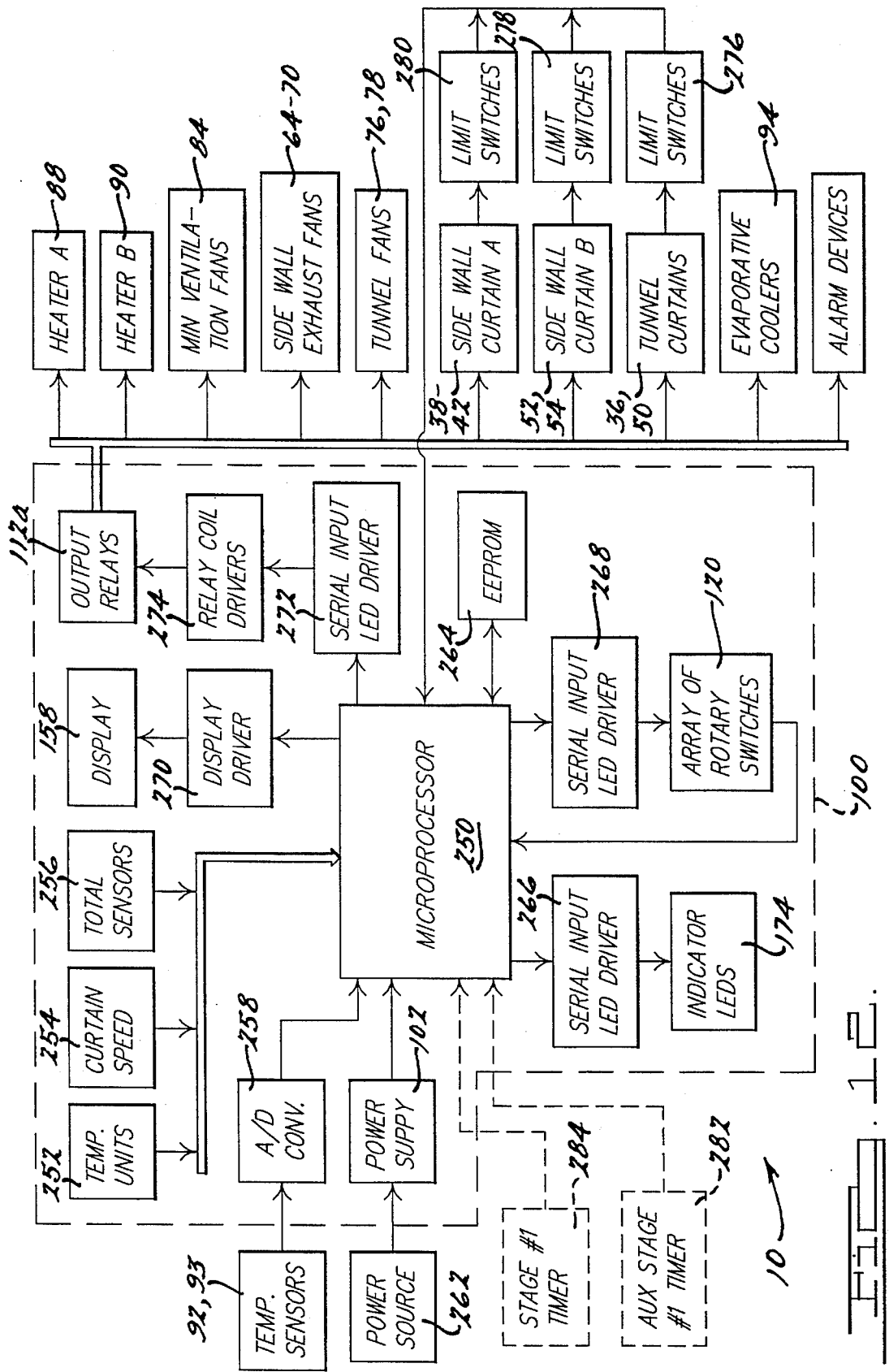

METHOD AND APPARATUS FOR CONTROLLING TEMPERATURE WITHIN POULTRY HOUSES AND THE LIKE

BACKGROUND OF THE INVENTION

1. Field of the Invention

This invention relates to a method and apparatus for controlling the temperature within a facility for use in housing animals, and more particularly to a method and apparatus for controlling the operation of a plurality of heating and cooling devices while allowing the status of operation of each such device to be quickly, visually checked by the user.

2. Description of the Related Art

In various industries such as those involving agriculture, it is often necessary to circulate relatively large amounts of air through a building to help maintain the interior of the building within a desired temperature range and to provide adequate ventilation. One such application where ventilation and control of the temperature within a building is extremely important is in connection with poultry houses. Such facilities are typically used to house chickens which are being grown for eventual slaughter or which are being used for egg production. Turkeys are also commonly kept in such poultry houses, although turkeys have been found to be somewhat less sensitive than chickens to large variations in the ambient temperature within the poultry house.

In a large scale poultry house, typically twenty thousand to twenty-five thousand chickens may be housed at a given time. If a poultry house is not properly ventilated, and the ambient temperature within it not properly controlled, the respiration of the chickens and the waste by-products within the poultry house can quickly give rise to a build up of ammonia and heat within the house which may be physiologically detrimental to the chickens. In extreme cases, such as where adequate ventilation and/or cooling is not provided on hot summer days, significant animal mortality may result. Even if mortality does not result, repeated lapses of proper ventilation and/or cooling can produce significant physiological stress on the chickens that result in inhibited growth, reduced egg production, and/or disease. Any of the above conditions may result in significant financial losses to a poultry farmer.

The problem with providing proper ventilation and cooling within a poultry house is exacerbated by the physiological differences between poultry of different ages. For example, very young chickens, hereafter referred to as "chicks", are more tolerant of higher temperatures than older chickens but also more sensitive to lower temperatures. It has been found that chicks suffer abnormal mortality below about 68°–70° F. However, chicks tolerate temperatures into the high 80° F. range quite well. More mature chickens, however, are much more tolerant of lower temperatures but become more susceptible to mortality as the ambient temperature within a poultry house without proper ventilation and cooling, reaches into the 80° F. range. Since chicks and more mature chickens must be housed in the same poultry house, this further increases the criticality of maintaining proper ventilation and a predetermined temperature range within the poultry house.

Further complicating the control of ventilation and temperature within poultry houses is the significant temperature swings experienced during many summer months during various parts of the day. For example, during the summer months the outside temperature is typically warmest between about 2:00 p.m. and 5:00 p.m. In the early evening, such as around 5:00 p.m., any slight wind or breeze present during the day typically dies down. Accordingly, the heat build up within a poultry house without proper cooling can become critically high. Simultaneously, since little or no breeze is present, ventilation within the poultry house, can also become critically poor, leading to an unacceptably high level of ammonia buildup in the building. Within a matter of hours, however, as evening approaches, the ambient temperature may drop significantly. Thus, the need for significant cooling within the poultry house may lessen or be completely eliminated. In this instance, adequate ventilation may be accomplished without the use of power driven cooling implements such as fans. The same situation may arise with the approach of an afternoon thunderstorm. The ambient temperature may drop significantly within a matter of an hour or less while the wind speed of the ambient air may increase significantly.

The above considerations dictate that a plurality of ventilation and cooling devices be carefully controlled to assure proper ventilation and relatively close control over the ambient temperature within a poultry house. Typically, this necessitates the use of one or more passive or active power driven cooling devices used in various combinations to achieve the desired level of ventilation and temperature control. Such devices typically may include power-driven curtains for opening portions of the poultry house to allow natural cross ventilation through the poultry house, a plurality of minimum ventilation fans disposed centrally throughout the poultry house for providing at least a minimum degree of air movement within the house, and/or a plurality of exhaust fans disposed about various walls of the poultry house for drawing air into and through the poultry house. More recently, a plurality of fans for inducing a significant air flow through the entire length of the poultry house to produce a "wind chill"—like effect has been practiced. This has been termed "tunnel" ventilation and is typically implemented at times of day when maximum cooling is needed.

Additionally, the foregoing devices are frequently used in connection with devices for providing some form of evaporative cooling. Such devices are typically known in the industry as "foggers". These devices provide a very fine water mist which helps in providing a cooling effect on the poultry. Well known cooling pads, which also provide evaporative cooling, are also frequently employed.

Frequently, various combinations of the above devices are required to be used for various lengths of times to achieve proper ventilation and temperature control within a poultry house. Merely as an example, during certain hours of the day, such as in the morning, it may be sufficient to have one or more minimum ventilation fans and/or exhaust fans running. As the day progresses, however, and as the temperature typically increases during the day, it may become necessary to open the curtains partially or completely while making all of the minimum ventilation fans operable. As the ambient temperature continues to increase, an even greater degree of cooling may become necessary. In this event it may become necessary to open the curtains completely while one or more exhaust fans remain on to aid in drawing air through the poultry house to achieve a greater degree of cross-ventilation and cooling. It also may become desirable to turn on one or more evaporative cooling devices to further aid in holding down the temperature within a predetermined, desirable range.

As the temperature continues to increase still further, it may become necessary to employ one or more tunnel ventilation fans to create an even greater rate of air flow through the entire length of the poultry house. This form of ventilation has been found to be quite effective in providing a cooling effect on the poultry sufficient to prevent physiological distress, even when the ambient temperature within the poultry house reaches a level which would quickly cause physiological distress or mortality without such tunnel ventilation. Still further, it may be desirable to supplement the cooling effect provided by the tunnel ventilation fans with operation of one or more of the evaporative cooling devices.

As the evening approaches and during night-time hours, the temperature may drop significantly such that sufficient ventilation may be achieved together with a desired ambient temperature within the poultry house with the power driven curtains closed, or almost completely closed, while only one or more of the minimum ventilation fans are operating.

In view of the above, it should be appreciated that a control system capable of controlling the various devices used to provide ventilation and to cool and heat a poultry house must provide a great deal of flexibility in control over numerous heating and cooling devices to maintain proper ventilation and temperature in spite of rapidly changing outside temperatures and wind conditions. In attempts to accomplish this degree of control, most recently developed control systems have typically employed some type of visual display terminal incorporating a keyboard and a menu system to enable a user to program and check the operational status of a number of independent heating and cooling devices. While such systems have proven somewhat effective in accomplishing control over the numerous cooling devices employed to ventilate and cool poultry houses, such systems have also proven to be quite cumbersome and "user-unfriendly" to operate. Exacerbating this problem is the fact that users of such systems may not have had prior operating experience with complicated video display equipment and menu-driven software, and are therefore often hampered in learning how to use such systems quickly without repeated reference to software operating manuals, hardware manuals, etc.

Perhaps the most significant drawback of temperature control systems which incorporate some form of video display terminal, keyboard and menu-driven software is the inability of such systems to provide a means by which each cooling and heating implement associated with a poultry house can be programmed, re-programmed, or its status checked visually, quickly and easily, without requiring the user to manipulate numerous controls or to proceed through numerous questions of a menu-driven software system before reaching the pertinent device. With such prior developed systems, the user is often forced to step through numerous menus or to enter numerous key strokes at a keyboard before finally reaching the portion of the program relating to the device or devices which he wishes to program or to make a status check on. Such systems become particularly cumbersome to program, and are particularly limited in the status information capable of being provided at a glance, when used with large poultry houses employing a plurality of independently controllable power-driven curtains, minimum ventilation fans, exhaust fans, tunnel fans, evaporative cooling devices and heaters.

SUMMARY OF THE INVENTION

In the preferred embodiments, the present invention relates to a method and apparatus for providing a facility having controlled ventilation and temperature, and more particularly to a facility for housing animals, such as a poultry house. The preferred embodiments include an apparatus for controlling temperature which is suited to allow quick and easy programming and control of any one of a large plurality of ventilation and cooling devices typically used in connection with poultry houses such as power driven curtains, minimum ventilation fans, side wall exhaust fans, tunnel ventilation fans, evaporative cooling devices, as well as heaters. The apparatus and method further provide the user with the capability of instantly programming any one of the plurality of power-driven cooling or heating implements used in connection with a poultry house without having to enter programming commands of the keyboard or answer numerous questions from a menu-driven software system.

The method and apparatus of the present invention further provides the user with an instantaneous, continuous visual indication of the programmed setting for each such power-driven cooling and heating device remote from the apparatus itself. Thus, the status of each and every power-driven cooling and heating device operating in connection with the poultry house can be visibly checked by the user, at a glance, without manually engaging any control whatsoever on the apparatus.

In a preferred embodiment, the present invention includes a structure defining a facility such as a poultry house. Means for regulating the temperature of air within the structure are provided and comprised of a first plurality of fans which operate to direct the air flow inside the structure in a first direction, and a second plurality of fans which direct the air within the structure in a second direction. Means for controlling the operation of the temperature regulating means are provided which include an enclosure defined in part by a front panel and a microprocessor based electronic controller system disposed within the enclosure which is operable to control the operation of the first and second plurality of fans. The enclosure further includes a first plurality of switches visible from the exterior of the enclosure, a second plurality of switches visible from the exterior of the enclosure, and means for continuously, visually indicating the position of each one of the switches of the first and second pluralities of switches remotely such that no physical manipulation of any portion of the controller means is required to obtain an instant visual indication of the status of any of the switches.

In the preferred embodiment described above, the first plurality of switches electrically communicates with the microprocessor and is operable to control the first plurality of fans. The second plurality of switches also electrically communicates with the microprocessor and is operable to control the second plurality of fans.

In the preferred embodiments the method and apparatus of the present invention provides a master selector switch means by which a plurality of stage temperatures and other operating parameters may be programmed or checked by the user, quickly and easily, without requiring the user to enter numerous keystrokes at a keyboard or to scroll through numerous menus of a software program. A set adjustment switch means is also included for enabling the user to modify one or more stage temperature settings, as well as to modify other user programmable variables. The master selector switch means and the set adjustment switch means thus allow the user to easily and conveniently check and program a variety of operating parameters. In the preferred embodiments a display is associated with the master selector switch means and the set adjustment means for providing the user with instantly visually readable information relating the programmed stage temperatures and other user definable operating parameters.

In the preferred embodiment the electronic controller system also includes at least one user accessible switch for allowing the user to read the temperature output from one or more temperature sensors disposed within the facility, and as well as allowing the user to designate at least one of the temperature sensors to be used by the system for controlling when one or more of the power-driven cooling devices turn on and off. Indicia is also included for visually designating which temperature sensor (when more than one is used), is to be used by the controller system for controlling the power-driven cooling devices.

The preferred embodiments of the present invention further provide for a first operating mode, in which a user-defined plurality of ventilation and/or cooling devices are made operational, a second operating mode in which a second plurality of cooling and/or ventilation devices are made operational, and a third operating mode in which a third plurality of cooling devices is made operational to provide maximum cooling within the poultry house. Uniquely, mode control switch means are included, together with indicia, which enable the user to program the temperatures at which each of the modes is to be entered. The preferred embodiments also enable the user to program that the cooling devices associated with two of the above operating modes be operational simultaneously.

In the preferred embodiment, the electronic controller system includes at least one switch accessible from the front panel for controlling a first group of power-driven curtains. Indicia is also included for providing the user with an instant visual indication as to the status or mode of each of the first group of power-driven curtains.

In the preferred embodiment the electronic controller system further includes at least one switch manually accessible by the user for independently controlling a second group of power-driven curtains. Indicia is also provided for providing the user with an instant visual indication of the status or programmed mode of operation of the second group of curtains.

In the preferred embodiment the electronic controller system further includes at least one switch manually accessible by the user for independently controlling and programming operation of a third group of curtains, such as a plurality of power-driven tunnel curtains. Indicia is also included for providing the user with an instant visual indication as to the status or programmed mode of operation of the third group of curtains.

In an alternative preferred embodiment the electronic controller system includes at least one auxiliary switch control accessible by the user for controlling and/or programming operation of at least one auxiliary ventilation fan disposed within the facility. Indicia is also included for providing the user with an instant visual indication as to the status or programmed mode of operation of the auxiliary ventilation fan(s).

In another alternative preferred embodiment the electronic controller system includes at least one user accessible switch for controlling and/or programming operation of one or more optional cooling devices, such as an evaporative cooling device. Indicia is also included for providing an instant visual indication of the status or programmed mode of operation of the cooling device.

Accordingly, it is a principal object of the present invention to provide a method and apparatus for controlling the ventilation and ambient temperature within a facility for housing animals such that the ventilation and ambient temperature can be maintained at desired, predetermined levels sufficient to prevent physiological distress to the animals housed within the facility.

More particularly, it is an object of the present invention to provide a method and apparatus for controlling ventilation and the ambient temperature within a poultry house in a manner sufficient to prevent physiological distress to animals such as chickens and turkeys.

It is yet another object of the present invention to provide a method and apparatus for controlling a plurality of power-driven cooling and heating devices used in connection with a poultry house, in various combinations as may be needed, to maintain sufficient ventilation and a predetermined temperature range within the poultry house, to thereby prevent physiological distress to poultry housed therein.

It is still another object of the present invention to provide a method and apparatus for controlling a plurality of minimum ventilation fans, power-driven curtains, exhaust fans, tunnel fans, evaporative cooling devices and heaters, all associated with a poultry house, in various combinations as needed to maintain proper ventilation and a desired temperature range within the poultry house in spite of widely varying fluctuations in the ambient temperature outside of the poultry house.

It is still another object of the present invention to provide a method and apparatus for allowing the user to instantly program or check operation of any one of a plurality of power-driven cooling and heating devices associated with a poultry house.

It is still another object of the present invention to provide a method and apparatus for controlling operation of a large plurality of power-driven cooling and heating devices associated with a poultry house, where the method and apparatus provide a continuous, instantaneous visual indication of the status and program state of every such power-driven cooling and heating device without requiring the user to manually engage any control of the apparatus beforehand.

It is yet another object of the present invention to provide a method and apparatus for allowing control of a plurality of power-driven curtains, a plurality of exhaust fans, a plurality of tunnel fans, a plurality of evaporative cooling devices and a plurality of heaters, in various combinations as required to maintain proper ventilation and a desired temperature range within a poultry house.

It is still another object of the present invention to provide a method and apparatus for implementing a power mode of operation wherein one or more minimum ventilation fans associated with a poultry house are controlled to provide a minimum degree of ventilation of the poultry house.

It is still another object of the present invention to provide a method and apparatus for implementing a natural mode of operation wherein ventilation and temperature are controlled by adjusting one or more of a plurality of power-driven curtains which may be opened or closed controllably to permit a degree of natural ventilation, alone or in connection with one or more minimum ventilation fans.

It is still another object of the present invention to provide a method and apparatus for implementing a tunnel mode of operation for cooling a poultry house, wherein in the tunnel mode the method and apparatus provides a maximum degree of cooling within the poultry house by causing one or more tunnel fans to cause a significant air flow to be generated within the poultry house.

It is yet another object of the present invention to provide a method and apparatus which may be used to control operation of one or more evaporative cooling devices simultaneously in connection with operation of the tunnel mode described immediately above.

BRIEF DESCRIPTION OF THE DRAWINGS

The features of the present invention which are believed to be novel are set forth with particularity in the appended claims. The organization and manner of operation of the invention, together with the further objects and advantages thereof, may best be understood by reference to the following description taken in conjunction with the accompanying drawings, in which identical reference numerals identify similar elements, and in which:

FIG. 1 is an elevational view of a structure in accordance with a preferred embodiment of the present invention forming a poultry house, with a roof thereof shown in broken-away form to illustrate various components within the poultry house not visible from the exterior thereof;

FIG. 6 is a view of the front panel of the electronic controller system;

FIG. 7 is an enlarged view of the master control section;

FIG. 8 is an enlarged view of the stage transition control section;

FIG. 9 is an enlarged view of the tunnel cooling stage control section;

FIG. 10 is an enlarged view of the auxiliary device stage control section;

FIG. 11 is an enlarged view of the Power/Natural cooling stage control section;

FIG. 12 is a block diagram of the temperature controller system of the present invention showing its major subsystems as well as the cooling and heating devices typically controlled by the system.

DETAILED DESCRIPTION OF THE PREFERRED EMBODIMENTS

Figure 2:
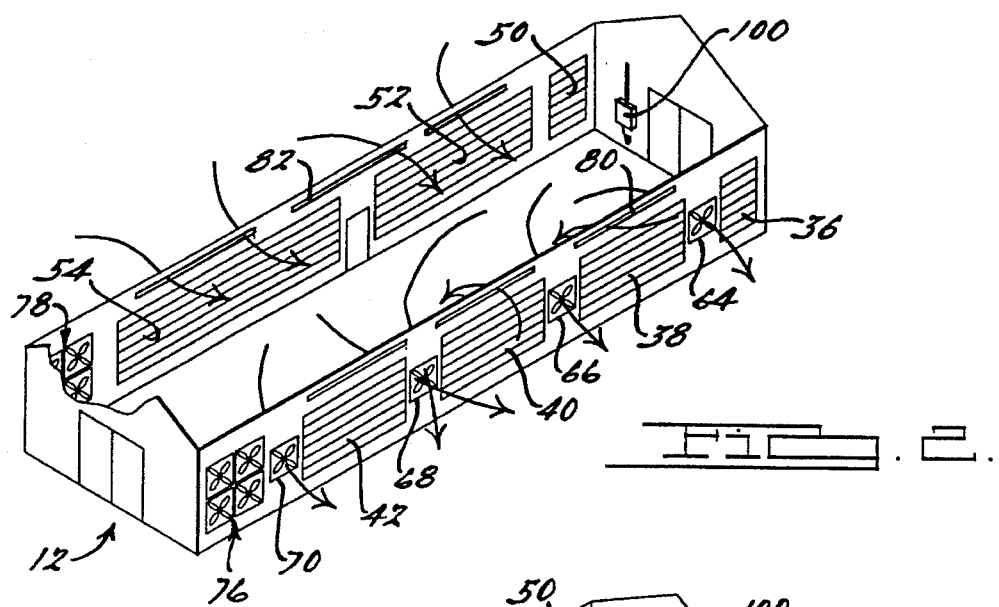
FIG. 2 is a view of the facility showing the airflow therethrough in the POWER mode of operation.

The following discussion of the preferred embodiments of the present invention is merely exemplary in nature. Accordingly, this discussion in no way is intended to limit the scope of the invention, the application of the invention or the use of the invention.

Figure 1:
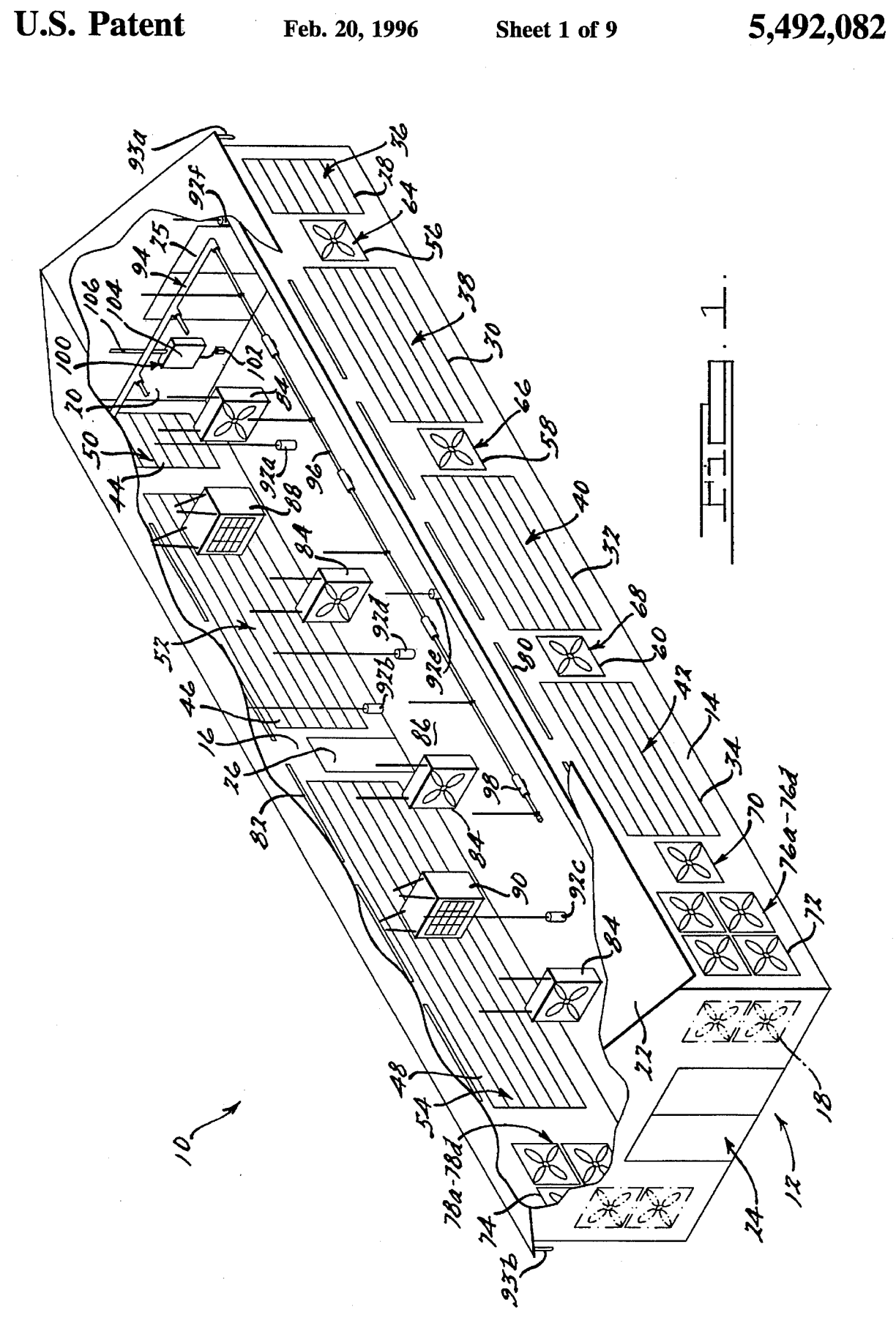

Referring to FIG. 1, an apparatus 10 is shown in accordance with a preferred embodiment of the present invention. The apparatus 10 is used for providing a facility 12 for housing animals within a well ventilated and temperature controlled environment. The facility 12 may be used to house a wide variety of animals such as chickens, turkeys, hogs or virtually any other animal requiring a relatively controlled temperature environment for adequate growth or production of food such as eggs. While the following description of the various preferred methods and apparatus of the present invention will be directed principally with reference to chickens, this is in no way intended to limit the application of the invention to such animals. Those skilled in the art will appreciate that the facility 12 described herein is readily adaptable with little or no modification for use with a wide variety of animals which may be sensitive to significant variations in ambient temperature.

With further reference to FIG. 1, the facility 12 includes a pair of opposing side walls 14 and 16, a front wall 18, a rear wall 20, and a roof 22 shown in break-away form to illustrate the various components used therein to control ventilation, humidity and temperature within the confines of the facility 12. The side walls 14 and 16 may vary greatly in length but, for a large scale poultry house, are typically approximately 400 ft. in length. The front wall 18 and rear wall 20 may also vary significantly in length but are typically approximately 40 ft. in length for a large scale poultry house. The front wall 18 typically includes a plurality of doors 24 for allowing access to the interior of the facility 12. A side access door 26 is typically included in the side wall 16 preferably at about a mid-point of the length of the side wall 16. Optionally included is a door 25 in the rear wall 20.

The side wall 14 is typically about 8 ft.–10 ft. in height and includes a plurality of openings 28, 30, 32 and 34 over which motor-driven curtains are disposed. In the preferred embodiment illustrated in FIG. 1, opening 28 may be covered completely by a tunnel curtain 36 disposed thereover which is adapted to be raised (i.e., opened) by a suitable electrically driven motor (not shown). Openings 30, 32 and 34 in the side wall 14 are each covered by a plurality of side wall curtains 38, 40 and 42 respectively. Each of the side wall curtains 38, 40 and 42 are capable of being controllably raised (i.e., closed) and lowered (i.e., opened) in conventional fashion by an electrically driven motor (not shown) associated therewith. It will be appreciated by those of ordinary skill in the art that the motors for each of the side wall curtains 38, 40 and 42 may be electrically coupled such that the side wall curtains 38, 40 and 42 will be raised and lowered simultaneously by an appropriate curtain controller (not shown). Such a controller is commercially available from the assignee of the present invention.

With further reference to FIG. 1, the side wall 16 also includes a plurality of openings 44, 46 and 48. The opening 44 has disposed thereover a second tunnel curtain 50 which, when fully lowered, completely covers the opening 44. The opening 46 has disposed thereover a side wall curtain 52 while the opening 48 is covered by a side wall curtain 54. It will be appreciated that each of the curtains 50, 52 and 54 is motor-driven, each having its own motor adapted to controllably raise and lower it in response to drive signals from a suitable curtain controller such as that mentioned above. As with the side wall curtains 38, 40 and 42, the side wall curtains 52 and 54 may be driven simultaneously between completely lowered and completely raised positions provided their respective motors (not shown) are electrically coupled so as to be driven by an independent curtain controller. Similarly, the motors associated with each of the tunnel curtains 36 and 50 may be controlled by an independent curtain controller such as mentioned above to cause both of the tunnel curtains 36 and 50 to be raised and lowered together substantially simultaneously. While it will be appreciated that the motors for the side wall curtains 38, 40, 42, 52 and 54 may be controlled in various arrangements to cause substantially simultaneous opening and closing of various combinations of the side wall curtains, the preferred methods and apparatus of the present invention contemplate controlling the side wall curtains 38, 40 and 42 as a single curtain via one curtain controller to cause simultaneous opening and closing of the curtains 38–42. Similarly, the motors for the side wall curtains 52 and 54 are preferably electrically controlled by a second curtain controller to cause the side wall curtains 52 and 54 to be simultaneously, controllably opened and closed. The curtains 36, 38, 40, 42 and 50–54 are commercially available from a variety of manufacturers and comprise light-weight, opaque plastic panels which are foldable to permit easy and neat raising and lowering.

With continued reference to FIG. 1, the side wall 14 includes a plurality of openings 56, 58, 60 and 62 within which are disposed side wall exhaust fans 64, 66, 68 and 70, respectively. The exhaust fans 64–70 may vary somewhat in their capacity to induce air flow but, in the preferred embodiments, are 220 volt, 36 inch diameter, one-half horsepower fans. Each of the side wall exhaust fans 64–70 are further oriented so as to exhaust air out of the interior of the facility 12. Fans suitable for performing this purpose are available from the assignee of the present invention. It is to be understood, however, that other suitable fans may be used.

Each of the side walls 14 and 16 include larger openings 72 and 74 positioned opposite each other. The opening 72 has mounted therein a plurality of tunnel fans 76a–76d and the opening 74 has mounted therein a plurality of tunnel fans 78a–78d. Each of the tunnel fans 76a–76d and 78a–78d preferably comprise 220 volt, 48 inch diameter, one horsepower fans oriented so as to draw air from inside the facility 12 and exhaust the air exteriorly with respect to the facility 12. It will be appreciated that while a plurality of four tunnel fans has been shown as disposed in each of the side walls 14 and 16, that one or more of the tunnel fans could optionally be disposed in suitable openings in the facility 12 as indicated in phantom in the drawing of FIG. 1. Alternatively, all of the tunnel fans 76a–76d and 78a–78d could be disposed in the front wall 18. The important consideration is that all of the tunnel fans 76a–76d and 78a–78d be disposed at an opposite end of the facility 12 from the tunnel curtains 36 and 50, which will be explained more fully in the following discussion.

With continued reference to FIG. 1, each of the side walls 14 and 16 further include a plurality of relatively thin, elongated openings 80 and 82, respectively. Preferably, the openings 80 and 82 are spaced along substantially the entire length of the side walls 14 and 16. The openings 80 and 82 are preferably relatively small in height, and more preferably about one-half inch in height. Optionally, the openings 80 and 82 could comprise a slat or louver—like elements adapted to open in relation to the degree of static pressure drop within the facility 12 caused by the side wall exhaust fans 64–70. In this case the height of the louver-like assemblies may be four to six inches.

With further reference to FIG. 1 and turning now to the interior of the facility 12, several of the cooling and heating devices used to control temperature, humidity and ventilation therein can be seen. A plurality of fans 84, commonly known in the industry as "stir" fans, may optionally be included to provide an additional level of minimum air movement within the facility 12. The stir fans 84 preferably comprise 220 volt, one-half horsepower, 36" diameter fans and are preferably suspended from a truss or other similar structure supporting the roof 22 so as to be positioned relatively close to a floor 86 of the facility 12. More preferably, the fans are suspended so that the bottom of each is disposed generally between about 3 ft. to 5 ft. from the floor 86. Also suspended from the structure supporting the roof 22 is a pair of optional heaters 88 and 90. The heaters 88 and 90 are also suspended so as to place them preferably about two and one-half ft.—three ft. from the floor 86. It will be appreciated that typically a plurality of heaters greater than two will be included in the facility 12 to sufficiently warm the interior of the facility at various times. A plurality of temperature sensors in the form of thermistors 92a–92f are also suspended to preferably within about eighteen inches from the floor 86. An optional pair of temperature sensors 93a and 93b in the form of thermistors may also be suspended or otherwise mounted exteriorly of the facility 12, such as from a portion of the roof 22 or on one or more of the walls 14–20. Preferably temperature sensors 92b and 92e are disposed more closely adjacent the sidewalls 14 and 16 and are each associated with one respective group of the sidewall curtains 38–42 and 52,54. More preferably, the temperature sensor 92b is associated with the sidewall curtains 52,54 and the temperature sensor 92e is associated with the sidewall curtains 38–42. Additionally, in the preferred embodiments one of the temperature sensors, 93, for example sensor 93f, is disposed inside the facility 12 near one of the tunnel curtains 36,50 such as the curtain 36. In this manner the pair of temperature sensors 92f and 93a could readily be used to help determine the efficiency of, for example, an optional cooing pad system disposed closely adjacent the tunnel curtain 36.

Optionally, an evaporative cooling system such as that generally known in the industry as a "fogger" 94 may be suspended from the structure supporting the roof 22. The optional fogger 94 shown in FIG. 1 includes 4 elongated, tubular water lines 96 (only one being shown), although it will be appreciated that a greater or lesser number of lines 96 could be used to suit the needs of specific applications. Each line 96 has a plurality of spaced apart nozzles 98 coupled in series in the line 96. Water is supplied to each of the lines 96 via a suitable pump and suitable electrically controlled valving which is well known in the art. The nozzles 98 each emit a very fine mist which also helps to cool the interior of the facility 12. Preferably, the fogger 96 is suspended from the structure supporting the roof 22 so as to be positioned near the ceilings and well above the floor 86. While the lines 96 may extend the entire length of the side walls 14 and 16, it has been found through experience that little evaporative cooling effect is provided in the very near vicinity of the tunnel fans 76 and 78 when these fans are operating. Accordingly, each of the lines 96 are preferably arranged so as to extend from a position in reasonably close proximity to the end wall 20 to a position approximately three-quarters of the length of the side walls 14 and 16. Obviously, however, other arrangements of fogger lines could be implemented to suit the needs of a specific application.

With further reference to FIG. 1, an electronic control system 100 in accordance with the preferred methods and apparatus of the present invention is fixedly mounted on one of the walls 14–20 within the facility 12. The controller system 100 controls operation of the tunnel curtains 36, 50, the side wall curtains 38–42 and 52,54, the side wall exhaust fans 64–70, the tunnel fans 76a–76d and 78a–78d, the optional stir fans 84, the optional heaters 88, 90 and the optional fogger system 94. Additionally, the electronic control system 100 is electrically coupled to the indoor temperature sensors 92, as well as the external temperature sensors 93. This enables the controller system 100 to monitor the temperatures at various internal areas of the facility 12 as well as at one or more areas exterior of the facility 12.

The electronic controller system 100 includes a power supply 102 which is adapted to receive a nominal 110 volt AC input and supply a regulated +12 volt dc output to the internal components of the system 100. The power supply 102 is also configured to enable the 110 volt AC input signal to be supplied directly to various electro-mechanical relays of the system 100. A plurality of electrical cables extend from an enclosure 104 of the controller system 100, preferably through a conduit 106 associated with the enclosure 104. It will be appreciated that the power supply 102 could optionally be disposed within the enclosure 104 if desired, provided suitable ventilation is provided. Such ventilation may be accomplished by openings in the enclosure and/or the addition of a cooling fan for drawing ambient air through the enclosure 104.

Figure 3:
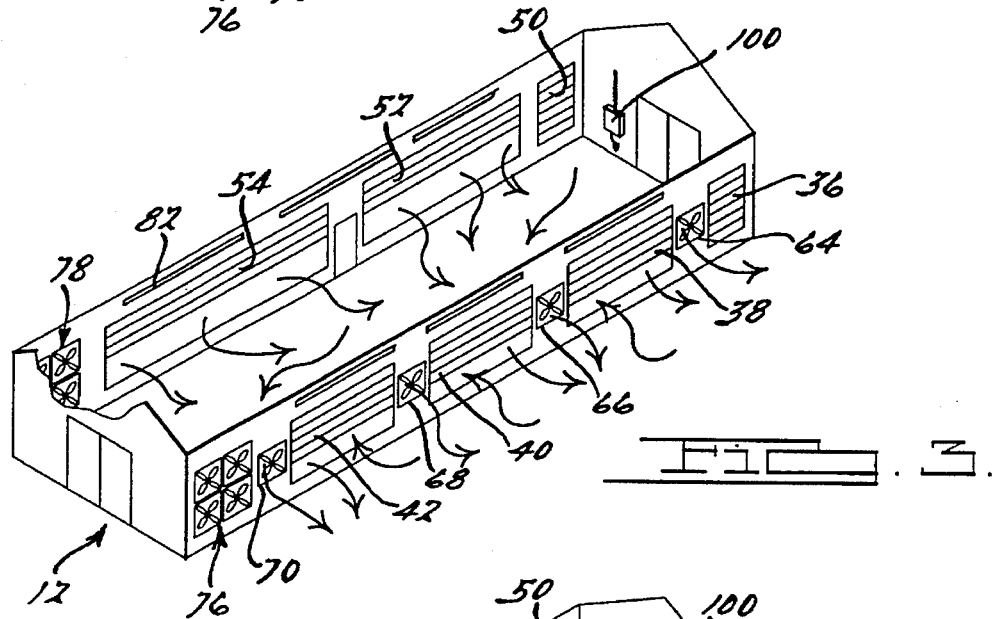
FIG. 3 is a view of the facility showing the airflow therethrough in the NATURAL mode of operation.
Figure 4:
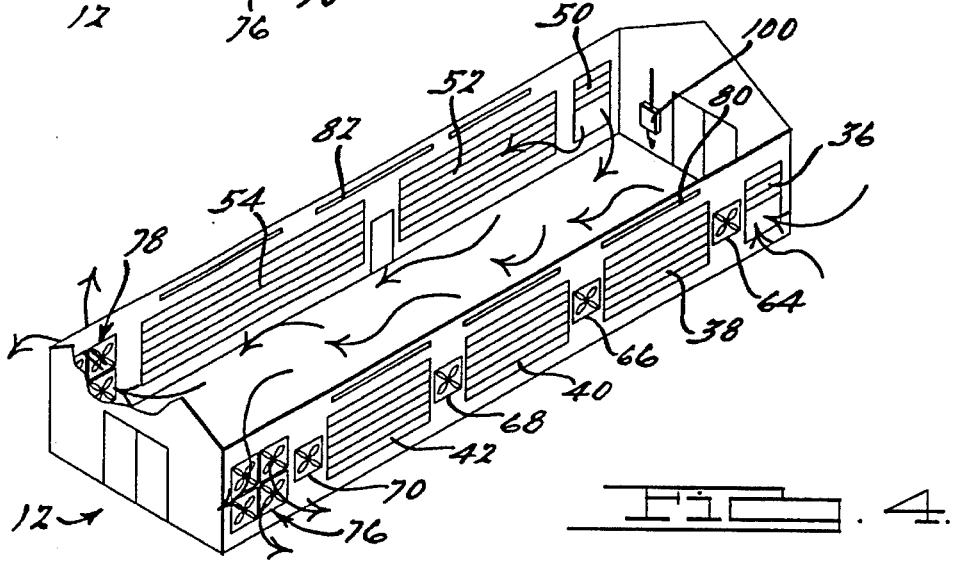
FIG. 4 is a view of the facility showing the airflow therethrough in the TUNNEL mode of operation.

Referring now to FIGS. 2–4, a description of the various modes of operation provided by the electronic controller system 100 for controlling ventilation and temperature within the facility 12 will be provided. The controller system 100 provides the user with the capability of defining a "POWER" mode of operation, a "NATURAL" mode of operation and a "TUNNEL" mode of operation.

Referring first to FIG. 2, the control provided over the various motor-driven devices in the POWER mode will be described. In the POWER mode, a minimum degree of ventilation is provided continuously to prevent the build-up of ammonia and to provide for at least a minimum degree of air circulation within the facility 12. In the POWER mode, the controller system 100 preferably maintains the side wall curtains 38–42 and 52,54 in fully closed (i.e., raised positions). The tunnel curtains 36 and 50 are similarly maintained in the closed position. One or more of the side wall exhaust fans 64–70 are turned on to provide for a minimum degree of ventilation within the facility 12. A small degree of ambient air from outside the facility 12 is drawn through the openings 80 and 82 and exhausted, together with ammonia—laden air within the facility 12, through the operating side wall exhaust fan(s) 64–70. Thus, in the POWER mode there is always at least a small degree of air circulation within the facility 12 regardless of the interior temperature, and further regardless of the ambient temperature outside of the facility 12. It will be appreciated, however, that if the optional stir fans 84 shown in FIG. 1 are included that one or more of these fans may be operated continuously or intermittently to further aid in circulating air within the facility 12. While in the POWER mode, as the interior temperature of the facility 12 rises, additional ones of the side wall exhaust fans 64–70 may be turned on in an effort to provide at least a small degree of cooling within the facility 12.

When the temperature within the facility 12 rises above a user predetermined stage temperature, as will be described in more detail momentarily, the electronic controller system 100 switches from the POWER mode to a "NATURAL" mode of operation. In the NATURAL mode of operation the side wall curtains 38–42 and 52,54 are opened at least slightly by the electronic control system 100, as shown in FIG. 3. In this manner, natural cross ventilation is employed to further help maintain the temperature within the facility 12 within a predefined temperature range. If the temperature within the facility 12 continues to rise, the side wall curtains 38–42 and 52,54 eventually are lowered to their fully open positions to permit maximum, natural cross ventilation through the facility 12. Optionally, the tunnel curtains 36 and 50 could be opened partially or completely by the controller system 100 to further aid in allowing natural cross ventilation to occur.

Referring now to FIG. 4, when the temperature within the poultry house 12 continues to rise despite operation of all of the side wall exhaust fans 64–70, and further despite all of the side wall curtains 38–42 and 52,54 being completely open, the electronic controller system 100 causes the TUNNEL mode of cooling to be entered. In this mode the side wall exhaust fans 64–70 are turned off and all of the side wall curtains 38–42 and 52,54 are raised (i.e., closed) completely. The tunnel curtains 36 and 50 are then opened (i.e., lowered) completely and the tunnel fans 76a–76d and 78a–78d are turned on. The tunnel fans 76 and 78 cause ambient air from outside of the facility 12 to be drawn into the interior of the facility 12 and through the entire length of the facility 12 before being exhausted through the tunnel fans 76 and 78. The velocity of the wind force generated within the facility 12 in the TUNNEL mode provides a "wind chill" cooling-like effect on the poultry therein. This significantly helps the poultry to tolerate extremely high temperatures, such as those in the 90° F. range, which would otherwise lead to quick physiological distress or mortality. Preferably, the air velocity generated within the poultry house 12, in the TUNNEL mode, is about three mph-five mph.

Accordingly, during the cooler portions of the day when it is desired to provide merely a degree of ventilation of the facility 12, the controller system 100 may be configured to remain in the POWER mode. As the temperature increases, the NATURAL mode may be entered to provide an added degree of cooling through natural cross ventilation of the facility 12. Optionally, the side wall exhaust fans 64–70 could be run simultaneously while the side wall curtains 38–42 and 52,54 are raised to provide a combination of POWER mode and NATURAL mode operation. If the temperature continues to rise, then the TUNNEL mode of operation is entered.

Figure 5:
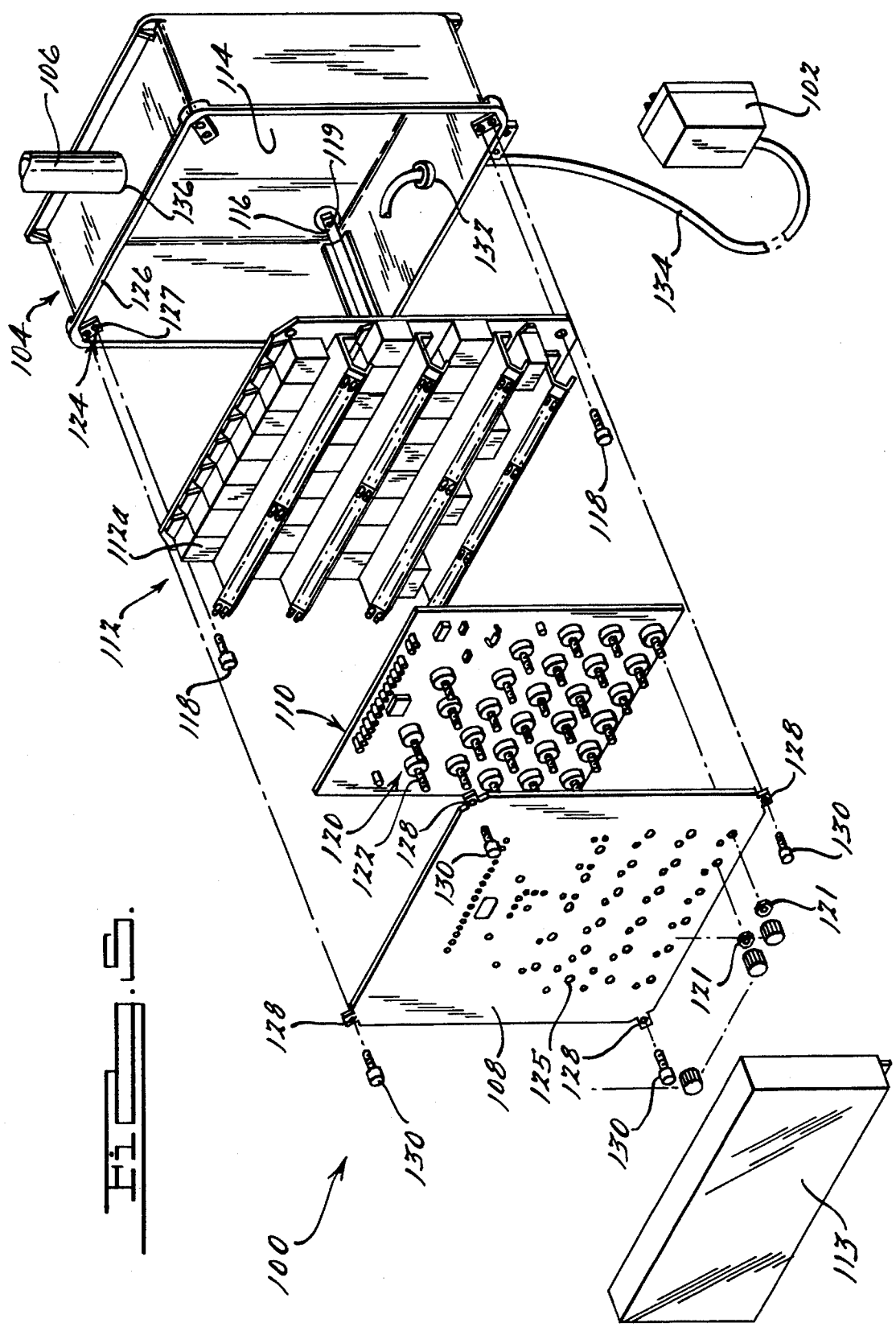
FIG. 5 is an exploded perspective view of the electronic controller system of the present invention.
Figure 5:
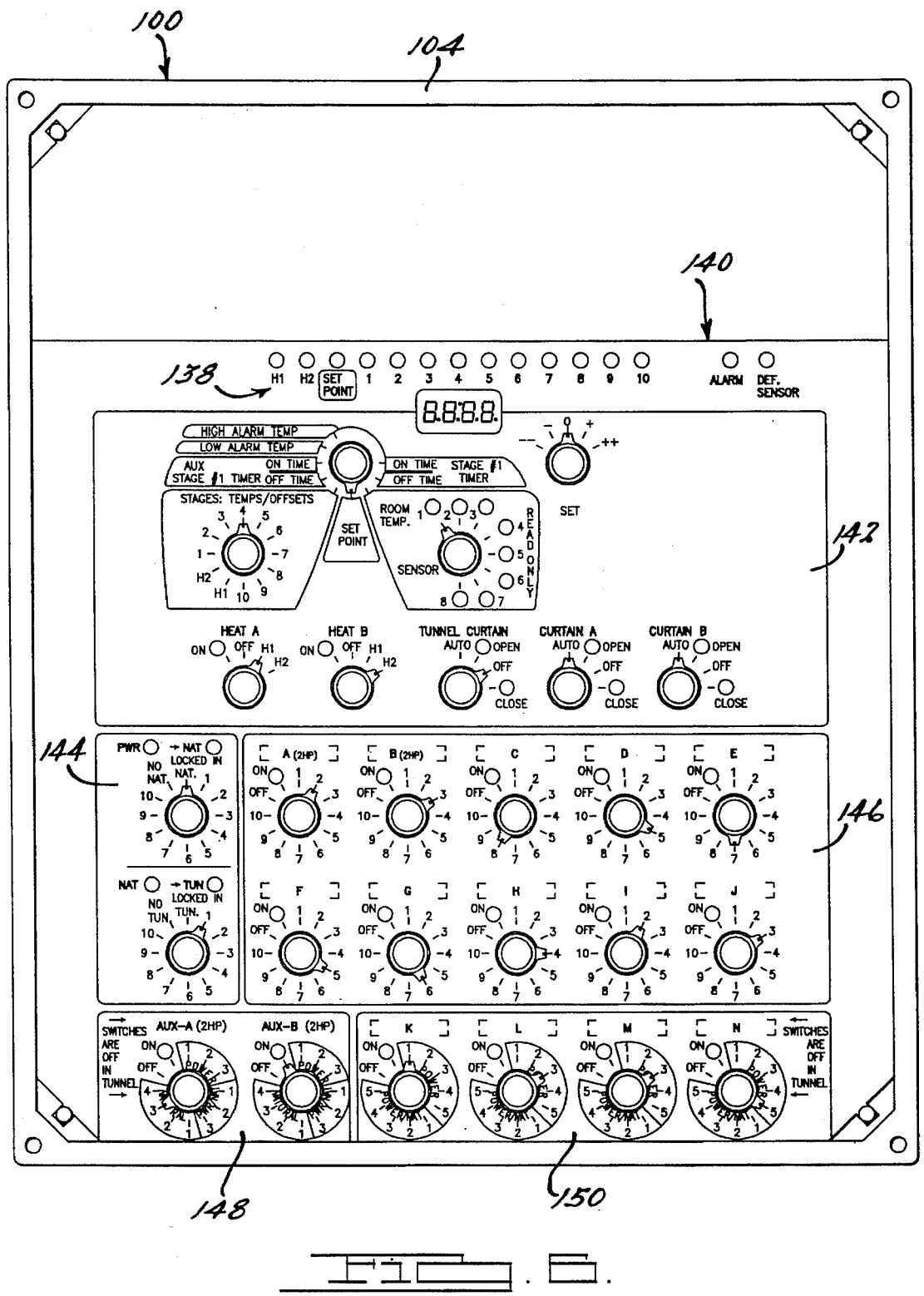

Referring now to FIG. 5, the major sub-components of the electronic control system 100 are illustrated. The system 100 includes a front panel 108, a main circuit board assembly 110, a relay board assembly 112 having a plurality of electro-mechanical relays 112a, and the enclosure 104. Optionally, a cover 113 could be hingedly secured to the front panel 108 to cover a portion thereof if so desired. Advantageously, the relays 112a are all disposed within the enclosure 104. The relay assembly board 112 is mounted closely adjacent a back wall 114 of the enclosure 104 by mounting brackets 116 disposed at each one of the four corners of the enclosure 104 within its interior and a plurality of threaded screws 118. The threaded screws 118 threadably engage with threaded apertures 119 in each of the mounting brackets 116.

The main circuit board assembly 110 is mechanically secured in spaced-apart relation to the front panel 108 by a plurality of rotary switch controls, the complete group of which is designated by reference numeral 120, on the main circuit board assembly 110 which project outwardly therefrom, and which each include a threaded shaft portion 122. The threaded shaft portion 122 of each rotary switch control of the group 120 extends through an associated one of a plurality of aligned openings 125 in the front panel 108 and an associated one of a plurality of threaded nuts 121 is secured thereto. A plurality of manually graspable knobs 129 are then secured to the threaded shafts 122 of the rotary switches 120, such as by set screws, to permit each of the switches of the switch group 120 to be easily manually turned.

The front panel 108 is secured to a second plurality of brackets 124 disposed at each corner of the enclosure 104 closely adjacent a front edge 126 of the enclosure 104. Each of the brackets 124, like the brackets 116, includes a threaded aperture 127. The front panel 108 includes a plurality of apertures 128 disposed so as to be aligned with the apertures 127 to permit a plurality of threaded fasteners 130 to extend therethrough into threaded engagement with the threaded apertures 127. It will be appreciated that the length and width of the main circuit board assembly 110 is small enough to permit it to clear the brackets 124 and to not block access to the brackets 124 when the front panel is placed in position to be secured by the threaded fasteners 130 to the enclosure 104. When assembled, the front panel 108, main circuit board assembly 110 and the relay board assembly 112 are mounted in spaced-apart relation from each other within the enclosure 104. An opening 132 is provided at a portion of the enclosure 104 to allow a suitable electrical cable 134 associated with the power supply 102 to provide power to the various components of the main circuit board assembly 110, in addition to the various individual relays 112a of the relay assembly board 112. A suitable opening 136 is also included in the enclosure 104 to permit egress of the plurality of electrical cables which extend to the various components controlled and monitored by the system 100.

Referring now to FIG. 6, the front panel 108 of the electronic control system is shown in greater detail. It will be appreciated immediately that the precise layout of the various controls accessible from the front panel 108, as well as the indicia associated with each such control, could be readily modified without departing from the spirit of the claims appended hereto. It will also be appreciated that the rotary switches referred to in FIGS. 6–12 have been denoted as the group 120, for simplification, in the drawing of FIG. 5.

The various controls and indicators accessible or readable from the front panel 108 are grouped into a plurality of logical sections. These sections include a first display section 138, a second display section 140, a master control section 142, a stage transition control section 144, a cooling stage control section 146, an auxiliary control section 148 and a Power/Natural cooling stage control section 150. It is a principal advantage of the preferred embodiments of the electronic controller system 100 that all of the various controls and indicators associated with the control of the various cooling and heating devices controlled by the system 100, as well as the various sensors read by the system 100, are readily manually accessible and continuously, visually readable by the user. Accordingly, there is no need to proceed through a complicated menu of a software program via a conventional keyboard to determine the status of any particular device being controlled by the system 100. Rather, as will become even more clear with the following discussion, the status of each device controlled by the system 100 can be determined visually, virtually instantaneously, by simply glancing at the front panel 108. Moreover, the controller system 100 provides the user with the capability to make modifications to the programmed state of any of the devices controlled by the system 100 quickly and easily, without first entering numerous keystrokes at a computer keyboard and/or scrolling through numerous menus of a software program.

Referring now to FIG. 7, the first display section 138, the second display section 140 and the master control section 142 are illustrated in greater detail. The master control section 142 includes a rotary master selector switch 152, a stage selector switch 154, a set adjustment switch 156, an LED display 158 and a temperature sensor selector switch 160. Switches 162 and 164 are included for independently controlling the operation of the optional heaters 88 and 90. A rotary selection switch 166 is included for providing master control over the tunnel curtains 36,50 (FIG. 1). A pair of rotary selection switches 168 and 170 are included for providing independent control over the side wall curtains 38–42 and 52,54. As described in connection with FIG. 1, the side wall curtains 38–42 are preferably controlled simultaneously, and preferably by the selection switch 168. Likewise, the operation of the side wall curtains 52,54 are preferably controlled simultaneously by the selector switch 170. However, it will be appreciated that the side wall curtains 38–42 and 52,54 could be separated into different groups of two if the needs of a particular application require such.

With continued reference to FIG. 7, the stage selector switch 154 and the set adjustment switch 156 allow a user to define thirteen different temperature levels, each representing a "stage temperature". The stage selector switch 154 has associated therewith indicia 155 including markings "H1", "H2" and numerals 1–10. Each of these markings indicate the position the stage selector switch 154 must be rotated to point at to either program or display a previously programmed temperature for a particular stage. The H1 marking corresponds to the switch position the switch 154 must be rotated to in order to check or program the stage temperature at which the first heater 88 becomes operational. The H2 marking corresponds to the switch position required to check or adjust the stage temperature at which the second optional heater 90 turns on.

The front panel 108 further includes indicia 161 for defining a "SET POINT" switch position which, when the switch 152 is rotated to, allows the user to define a SET POINT temperature. The SET POINT temperature represents a user determined ideal temperature within the facility 12 which the user desires the interior of the facility 12 to be maintained at. Additional indicia 165 is provided denoting the position the master selector switch 152 must be placed in to program or check an on-time interval and an off-time interval for a timer of the controller system 100 associated with the stage 1 temperature.

Indicia 163 defines positions which the switch 152 must be placed in to set or check an on-time and an off-time for an auxiliary stage 1 timer of the controller system 100. Indicia 167a and 167b define switch positions which the switch 152 must be placed in to define or check user-defined low and high alarm temperatures. The low and high alarm temperatures are temperatures which, when reached, cause some alarm indication to be provided to indicate to the user that the temperature within the facility 12 has dropped to or below the low alarm temperature, or risen to or above the high alarm temperature. Indicia 169 defines positions which the switch must be placed in to set an "ON" time and an "OFF" time for the internal stage #1 timer.

The indicia 165 defines the positions of the temperature sensor selector switch 160 which the switch 160 must be placed in to read the temperature sensed by each of the indoor temperature sensors 92a–92f as well as the outdoor temperature sensors 93a and 93b. The temperature sensor selector switch 160 provides the additional function of enabling the user to define which one of three of the indoor temperature sensors 92a–92f may be used as a "main" indoor temperature which the controller 100 uses to control the external heating and cooling devices of the facility 12. As an example, if the switch 160 is set to "2", the indoor temperature sensor 92a–92f associated with this switch position is designated by the controller system 100 as the temperature sensor which will be monitored for purposes of determining when the various stage temperatures have been reached within the facility 12. If by chance the user has checked the status of one of the sensors associated with the "READ ONLY" switch positions 4–6, and has failed to place the switch 160 back to one of positions 1–3, then the controller system 100 automatically designates the temperature sensor associated with switch position 1 as the temperature sensor that will be used for determining when the various stage temperatures have been reached. With this in mind, it is preferred that the temperature sensor 92a–92f associated with the "1" position of the selector switch 160 be disposed within the facility 12 at an area therein which is expected to be most representative of the overall temperature within the facility 12. It will be noted, however, that the preferred embodiments contemplate assigning control over the side wall curtains 38–42 solely to the temperature reading provided by the sensor 92e, and control over the side wall curtains 52,54 solely to the temperature sensed by the sensor 92b. However, the system 100 provides the user with the flexibility of designating a plurality of different temperature sensors 92 which may be used to determine the temperature within the facility 12 for controlling the other cooling devices. Accordingly, even if the switch 160 has been set to "3", and if the number three temperature sensor is not either of the sensors 92b or 92e, the side wall curtains 38–42 and 52,54 will still be operated only in response to the temperatures sensed by the sensors 92b and 92e. It will be appreciated, however, that this arrangement could be easily modified to allow all of the power-driven cooling and heating devices to be controlled by any of the sensors 92 or 93 associated with switch positions "1"–"3" of the switch 160.

With the above in mind, it will also be appreciated that a completely separate rotary switch could be included to allow the user to designate any one of the sensors 92 to be used for controlling the system 100. In this instance, the switch 160 could be configured as strictly a "read only" switch.

It will be readily appreciated that another modification which could be easily made is the averaging of the temperatures sensed by two or more of the indoor temperature sensors 92a–92f for purposes of defining an indoor temperature within the facility 12 which the controller system 100 uses for control purposes. In this event, if the selector switch 160 was left in one of the READ ONLY positions 4–6, the controller system 100 would still determine an average temperature from two or more predetermined indoor temperature sensors 92a–92f.

With continued reference to FIG. 7, the programming of the individual stage temperatures will now be described. The master selection switch 152 is first moved to the SET POINT position. At this point a default SET POINT temperature is displayed in the LED display 158. The user may increment or decrement the default temperature by turning the set adjustment switch 156. The set adjustment switch 156 includes indicia 172 which is comprised of "0", "–", "— —", "+" and "++". By turning the set adjustment switch 156 toward the "–" position, the SET POINT temperature displayed in the display 158 is decremented at a first rate. Moving the set adjustment switch 156 to the "— —" position causes a more rapid decrease in the SET POINT temperature shown in the LED display 158. Leaving the set adjustment switch 156 at the "0" position causes no change in the displayed default SET POINT temperature. Turning the switch 156 to the "+" position causes the displayed default SET POINT temperature to be increased at a first rate, and turning the switch 156 further to the "++" position causes the displayed SET POINT temperature to be incremented at a second rate faster than that provided when in the "+" position. In this manner the user can define a SET POINT temperature which is stored in the electronic controller system 100 for future use. As discussed previously herein, the SET POINT temperature represents that temperature which the electronic controller system 100 attempts to attain and maintain within the facility 12.

After the SET POINT temperature has been selected, the operator may rotate the master selection switch 152 to point towards the indicia 155. In this position electronic controller system 100 permits the user to define the plurality of stage temperatures at which operation of the various heating and cooling devices associated with the facility 12 turn on. By placing the stage selector switch 154 at "1", the temperature of stage 1 can be incremented or decremented from the default SET POINT temperature displayed in the LED display 158 by manipulating the set adjustment switch 156 between its various positions. If the user has previously defined a stage 1 temperature, then moving the stage selector switch 154 to stage 1 will cause the previously defined stage 1 temperature to be displayed in the display 158. Moving the stage selector switch 154 to the "2" position subsequently allows the user to check or program the stage 2 temperature in a manner identical to that described for stage 1. Stages 3–10 can be similarly checked via the LED display 158 and reprogrammed if necessary via the set adjustment switch 156. Moving the stage selector switch to the position "H1" allows a first stage temperature below the SET POINT temperature to be defined (or checked) at which the user desires the first heater 88 to turn on. Similarly, turning the stage selector switch to the position "H2" allows a second stage temperature below the H1 stage temperature to be defined (or checked) at which the second heater 90 turns on. Accordingly, by merely moving the master selection switch 152 to the indicia 155, and by manipulating the stage selector switch 154, the user defined temperatures associated with each of the stages can be quickly and easily visually checked by viewing the LED display 158, and readadusted if necessary by simply manipulating the set adjustment switch 156. Accordingly, there is no need to employ cumbersome menu driven software systems and computer keyboard assemblies for permitting the operator to check or reprogram the temperature or any particular stage.

With further reference to FIG. 7, after the individual stage temperatures have been set by the user the master selection switch 152 may be moved toward the indicia 163 denoting the "AUX STAGE #1" timer section. When placed in this position, the master selection switch 152 allows the on-time and off-time of an internal, auxiliary timer of the controller system 100 to be checked or reprogrammed. The function of this particular timer will be described shortly in connection with FIG. 10.

When the master selection switch 152 is rotated to point at the designation "ON-TIME" of the indicia 163, the on-time of the auxiliary timer may be viewed in the LED display 158. When moved to the "OFF-TIME" position, the off-time of the auxiliary timer can be checked or programmed by viewing the LED display. In either instance, programming is accomplished by manipulating the SET ADJUSTMENT switch 156 to either increment or decrement the ON-TIME or OFF-TIME intervals displayed in the LED display 158. For simplicity, the ON-TIME and OFF-TIME intervals are displayed in the display 158 in seconds starting at zero seconds after power-up of the system 100. It will be appreciated, however, that the display 158 could readily be modified to display these times in minutes and seconds rather than just seconds.

With continued reference to FIG. 7, the user continues the programming operation by rotating the master selection switch 152 to the indicia 167a. The indicia 167a, which comprises a marking "LOW ALARM TEMP", denotes a position of the switch 152 wherein the user may define an alarm temperature indicating a temperature level below the lowest defined stage temperature (i.e., typically that associated with stage H2). She LOW ALARM TEMP value is displayed in the LED display 158 and incremented or decremented by the SET ADJUSTMENT switch 156. Moving the master selection switch 152 to indicia 167b, comprising the marking "HIGH ALARM TEMP", allows the user to check a previously defined high alarm temperature by viewing the LED display 158, or to set a new high alarm temperature using the display 158 and the SET ADJUSTMENT switch 156. The high alarm temperature represents a condition in which the temperature within the facility 12 meets or exceeds a predetermined maximum temperature. In either event, the controller system 100 is capable of generating an alarm condition signal indicative of either situation. Accordingly, this affords the user some notice and an opportunity to intervene in an attempt to bring the temperature within the facility 12 within acceptable limits.

Preferably one or more of the relays 112a (FIG. 5) are responsive to both of these alarm conditions, and are coupled to indicating devices which can apprise the user of an alarm condition even when the user is not physically present near the electronic controller system 100. Such devices, for example, could comprise an automatic telephone dialer system adapted to dial a pager facility, which could in turn notify the user via a pager carried on the person of the user of an alarm condition. Alternatively, an audible signal such as a siren located outside of the facility 12, or near the living facility of the user, might be employed. It will be appreciated that numerous other forms of devices could be employed to provide the user with notice of an alarm condition when the user is not present in or near the facility 12.

With continued reference to FIG. 7, when the user rotates the master selection switch 152 toward the indicia 165, an ON-TIME and OFF-TIME for a timer dedicated to stage 1 operation may be checked in the LED display 158 and/or programmed. Placing the switch 152 so that it points towards the designation "ON-TIME" allows the ON-TIME to be adjusted from zero seconds after power-up, via the SET ADJUSTMENT switch 156 while viewing the LED display 158. Likewise, moving the switch 152 to the OFF-TIME marking allows the user to set the off-time interval for the stage 1 timer. The electronic controller system 100 will then automatically cycle the cooling devices intended to operate when the stage 1 temperature is reached in accordance with the on and off times set for the stage 1 timer before the stage 1 temperature is reached.

Referring now to the first display section 138, a plurality of thirteen LEDs 174 are shown together with indicia 175. Ten of the LEDs 174 are denoted by numerals 1–10, which correspond to temperature stages 1–10 defined by the user. One of the LEDs 174 corresponds to the SET POINT temperature and two correspond to the temperature stages H1 and H2. As an example, when the temperature within the facility 12 is at the user defined SET POINT temperature, the LED 174 denoting "SET POINT" becomes illuminated. Preferably, this LED is of a different color from the other LED's of the group, such as green. If the temperature within the facility 12 drops to the temperature connected with stage H1 then the LED directly over the marking "H1" becomes illuminated. If the temperature drops still further and reaches the H2 stage temperature then the LED above the marking "H2" becomes illuminated. Conversely, when the temperature within the facility 12 increases beyond the SET POINT temperature to the stage 1 temperature defined by the user, then the LED above "1" becomes illuminated. If the temperature within the poultry house increases to the stage 2 temperature defined by the user, then the LED above the "2" marking is illuminated. As the temperature continues to rise the LEDs associated with markings "3"–"10" become illuminated. In this manner the user is provided with an immediate, continuous visual indication as to what stage temperature has been reached within the facility 12. Accordingly, there is no need to manipulate numerous keys of a computer keyboard such as might be required to scroll through a menu-driven software program to determine the present temperature stage which has been reached within the facility 12. Thus, the user is more likely to be apprised of approaching temperature conditions within the facility 12 which could be physiologically distressful to the animals therein.

With further regard to the alarm conditions discussed immediately above, the optional second display 140 includes an LED 176a which may also provide an immediate visual indication that the temperature within the facility 12 has reached or exceeded predetermined lower and upper limits. It will be appreciated, however, that if the user is not within the facility 12 and therefore not able to visually notice the LED 176a, that the user would not be apprised of an alarm condition. Accordingly, it is anticipated that some form of external warning device such as a pager will be most preferable for providing the user with an instant indication of an alarm condition.

With further reference to FIG. 7, the LED 176b may be optionally, but preferably, included to visually indicate that one or more of the temperature sensors 92 and 93 is/are defective. In this regard the controller system 100 could be programmed to recognize when the temperature sensors 92 and 93 are providing electrical signals clearly outside of an expected range of signals. The user could then use the switch 160 and the LED display 158 to determine which one (or more) of the sensors 92 and 93 are defective. It will also be appreciated that the system 100 could be readily modified to also provide an alarm indication, and to possibly signal an external device such as a telephone dialing system, if a defective sensor condition arises.

Referring still further to FIG. 7, the master control section 142 allows the user to select the operational mode for the optional heaters 88,90, the tunnel curtains 36,50, the first group of side wall curtains 38–42, and the second group of side wall curtains 52,54. Since the function of the switches 162 and 164 is identical, only the operation of the switch 162 will be described. The switch 162 has indicia 178 associated with it denoting a continuous "ON" mode, an "OFF" mode, a stage "H1" temperature operating mode, and a stage "H2" temperature operating mode. When the switch 162 is positioned to the H1 marking the first optional heater 88 turns on when the H1 stage temperature is reached within the facility 12. If the switch 162 is positioned to the H2 marking, then the heater 88 turns on when the H2 stage temperature is reached within the facility 12. If the switch 162 is placed in the "ON" position then the heather 88 runs continuously. If placed in the "OFF" position then the heater 90 will never be turned on by the controller system 100. Thus, the user is provided with the capability of setting the heater 88 to turn on automatically when the H1 stage temperature is reached, or to run continuously, or to be turned off such that it will not become operational, even when the H1 stage temperature is reached. An optional LED 180 provides an even more conspicuous visual indication that the heater 88 has been commanded to run continuously.

The "TUNNEL CURTAIN" mode control switch 166 includes indicia 184 for defining an automatic mode of operation "AUTO", an "OFF" mode, an "OPEN" mode and a "CLOSED" mode. In the AUTO mode, the tunnel curtains 36,50 are controlled to open automatically at a stage temperature defined by the user when the TUNNEL mode of operation is entered. This will be described in more detail momentarily in connection with FIGS. 8 and 9. When the switch 166 is rotated to the "OPEN" mode, the tunnel curtains 36,50 are immediately opened completely. When the switch 166 is moved to the CLOSED position the tunnel curtains 36,50 are be immediately closed (i.e., lowered). Placing the switch 166 in the OFF position provides an override which allows the tunnel curtains 36,50 to remain in their present position (i.e., either open or closed) regardless if the stage temperature at which the tunnel mode would normally be entered is attained. Accordingly, either automatic or manual control is allowed by the controller system 100 over operation of the tunnel curtains 36,50. It will also be noted that the OPEN and OFF modes include LEDs 186 and 188, respectively, which provide an even more conspicuous visual indication to the user that the tunnel curtains 36,50 will not be automatically controlled by the system 100.

Referring to the side wall curtain control switches 168 and 170, indicia 190 and indicia 192 are provided identical to the indicia 184 associated with the TUNNEL CURTAIN mode control switch 166. As described herein, the side wall curtains 38–42 may be configured to operate as a group, and may be considered as curtain "Group A". Similarly, the side wall curtains 52 and 54 may be configured to operate simultaneously, and may be considered as curtain "Group B". In this manner automatic and manual modes of control are provided for each of the curtain groups A and B by the mode control switches 168 and 170. The methods and apparatus of the preferred embodiments further provide that operation of the side wall curtains 52,54 is preferably controlled by the temperature output from temperature sensor 96b (FIG. 1), while the side wall curtain group comprising the side wall curtains 38–42 is controlled by the output of the temperature sensor 92e. Since these temperature sensors 96b and 92e are disposed more closely adjacent the side walls 16 and 14, respectively, they provide an even more accurate determination of the temperatures near the curtain groups 52,54 and 38–42 respectively.

Referring now to FIG. 8, the stage transition control section 144 will be described in greater detail. This section includes a Power-to-Natural transition selector switch 194 for defining the stage temperature at which the controller 100 causes a transition to be made from the POWER mode to the NATURAL mode of operation. A second switch 196 defines the stage temperature at which the transition from NATURAL mode to TUNNEL mode of operation occurs. The switch 194 includes indicia 198 indicating positions relating to stage temperatures 1–10, a "NO NAT." mode, and a "LOCKED IN NAT." mode. When the switch 194 is directed towards, for example, "6", the transition from POWER mode to NATURAL mode occurs at the user defined temperature for stage temperature 6. Turning the selector switch 194 to the "NO NAT." position causes the NATURAL mode of operation to be ignored (i.e., not implemented), and the system 100 to remain in the POWER mode. Moving the switch 194 to the "LOCKED IN NAT." position causes it to be locked in the NATURAL mode of operation continuously. An LED 200 indicates when the system is operating in the POWER mode. When the POWER mode is exited and the NATURAL mode is entered the LED 200 goes off and a second LED 202 is turned on to indicate that the NATURAL mode has been entered. Thus, the LEDs 200 and 202 and the indicia 198 provide the user with a quick, continuous visual identification, without engaging any keys of a keyboard or other like device, as to what stage (i.e., POWER or NATURAL) the electronic controller system 100 is presently operating in, as well as what stage temperature this transition is to be made at when under automatic control of the system 100.

With further reference to FIG. 8, the Natural-to-Tunnel transition selector switch 196 and indicia 207 define the stage temperature at which the NATURAL mode of operation is exited and the TUNNEL mode is entered. An LED 204 is included for providing a continuous, visual indication to the user when the controller system 100 is operating in the NATURAL mode. An LED 206 provides a continuous, visual indication as to when the TUNNEL mode of operation has been entered. When the switch 196 is set to, for example, the "8" position, the transition from NATURAL mode to TUNNEL mode operation occurs at stage temperature 8. Placing the switch 196 at any of the other positions 1–10 causes the transition to occur at the selected stage temperature. When the switch 196 is placed in the "NO TUN." position, entry into the TUNNEL mode will be prevented and operation in the NATURAL mode will be maintained. When the switch 196 is placed in "LOCKED" IN "TUN.", the controller system 100 is locked in the TUNNEL mode of operation. Thus, switch 196 provides the user with the capability of quickly and easily defining the stage temperature at which the transition from NATURAL mode operation to TUNNEL mode operation occurs. Additionally, the switch control 196 allows the TUNNEL mode of operation to be "locked out" such that the TUNNEL mode cannot be entered, and "locked in" such that the controller system 100 remains in the TUNNEL mode of operation continuously. Should the switch 194 be left in the "LOCKED IN NAT." position simultaneously with the switch 196 being left in the "LOCKED IN TUN." position, the NATURAL mode of operation takes priority. Preferably a one to two second time delay is incorporated before a transition from the POWER mode to the NATURAL mode, and from the NATURAL mode to the TUNNEL mode. This helps to reduce the likelihood of transitions being made in response to spurious readings by the temperature sensors 92 and 93. Additionally, the preferred embodiments of the controller system 100 bring each of the cooling devices on one at a time, that are set to turn on, or which will be turned on automatically, after a power outage has occurred.

Referring now to FIG. 9, the tunnel cooling stage control section 146 will be described in more detail. This stage includes stage selection rotary stage selection switches 208–226. Stage selection switches 208–222, in the preferred embodiments, are associated with the tunnel fans 76a–76d and 78a–78d (FIG. 1). Each one of the stage selection switches 208–222 is associated with a respective one of the tunnel fans 76a–76d, 78a–78d for controlling the stage temperature at which its respective tunnel fan turns on. Once any one of the tunnel fans 76a–76d and 78a–78d turn on they remain on for all stage temperatures above the stage temperature at which they are programmed to turn on. These switches 208–226, however, are not restricted to use only in the TUNNEL mode, and the devices which they control will turn on and off in response to the stage temperature selected at each of the switches 208–226. It will be appreciated that the operation of the switches 208–226 are identical. Thus, only the operation of the switch 208 will be described.

Referring now specifically to stage selection switch 208, indicia 227 is included which defines positions "1"–"10", "OFF" and "ON". An optional LED 205 provides a conspicuous visual indication that the switch 208 has been placed in the "ON" position. When the stage selection switch 208 is positioned, for example at "6", the tunnel fan 76, 78 associated with the switch 208, for example tunnel fan 76a, turns on. As stage temperatures above stage temperature 6 are reached within the facility 12 the tunnel fan 76a remains operational once turned on. The tunnel fan 76a will not be turned off until the temperature within the poultry house drops below the stage temperature 6. More preferably, to prevent brief, intermittent on and off cycling of the tunnel fan 76a, the tunnel fan 76a is not turned off until the second stage temperature below which it is set to turn on is reached inside the facility 12. Thus, if stage selection switch is set at "6", the tunnel fan 76a becomes operational when stage temperature 6 is reached and remains operational until the temperature within the poultry house drops to that of the stage 4 temperature. If the stage selection switch 208 is placed in the "OFF" position, then the tunnel fan 76a will not be turned on when the TUNNEL mode is entered. If the switch 208 is placed to the "ON" position, then the tunnel fan 76a will run continuously regardless if the control system 100 is otherwise operating in the POWER or NATURAL modes. Thus, each of the stage selection switches 208–222 provide a user with the capability of programming any one, or all, of the tunnel fans 76,78 to turn on and operate continuously when a predefined stage temperature is reached or to override this "automatic" form of control to disable operation of any particular one, or all, of the tunnel fans 76,78, or further to cause any one of the tunnel fans 76,78 to operate continuously.

Since independent stage selection switches 208–222 are provided for each of the tunnel fans 76,78, there is no requirement for the user to first enter numerous commands at a keyboard or to step through a menu-driven program to reach the point where a specific tunnel fan 76,78 may be programmed or manually controlled. It will also be appreciated that the relays 112a associated with the stage selection switches 208 and 210 are, in the preferred embodiments, capable of handling a current flow sufficient to drive a pair of two horsepower fans. It will be readily appreciated, however, that various combinations of the tunnel fans 76,78 may be coupled to the stage selection switches 208–222 with little or no modification to the electronic controller system 100. For example, since the relays associated with the stage selection switches 208 and 210 are capable of each providing current sufficient to drive two 2 horsepower fans, these relays alone could each be used to drive two 1 horsepower fans or even four ½ horsepower fans. This provides significant added flexibility in designing a tunnel cooling system by allowing an even greater number of tunnel fans 76,78 than that illustrated in FIG. 1.

With continued reference to FIG. 9, the stage selection switches 224 and 226 are preferably associated with some form of evaporative cooling system such as fogger system 94 shown in FIG. 1. The switches 224 and 226 operate in a manner identical to the description provided for the stage selection switch 208 to provide the operator with the capability of defining a stage temperature at which the optional evaporative cooling system 94 is to turn on. In addition, the user is afforded the capability of causing the cooling systems associated with the switches 224 and 226 to each be continuously disabled (i.e., turned off) as well as maintained continuously on. Merely as an example, the stage selection switch 224 could be configured to control an electronic solenoid valve which controls the flow of water through a pair of fogger lines 96 while the other switch 226 controls an independent solenoid valve for controlling the flow of water through two other fogger lines. Optionally, independent cooling pads, well known in the art, could be controlled by the switches 224 and 226 if desired.

As an added degree of control over the stage selection switches 224 and 226, each of these switches is controlled by the ON and OFF times programmed in connection with the auxiliary stage 1 timer described in FIG. 7. Accordingly, the devices associated with the switches 224 and 226 are each cycled ON and OFF in accordance with the ON TIME and the OFF TIME programmed by the user. Thus, for example, if the switch 224 is set to stage temperature 4, when stage temperature 4 is reached the device associated with the switch 224 will begin cycling on and off in accordance with the user defined ON TIME and OFF TIME. Below the stage temperature set by the switch 224 the device does not operate. If continuous operation of the cooling device associated with the stage selection switch 224 is desired, then the OFF TIME of the internal auxiliary stage 1 timer may be set to zero. This causes the device associated with the switch 224 to operate continuously once the stage temperature selected by the switch 224 is reached within the facility 12.

A further advantage provided by the switches 208–226 is that the point at which each of the tunnel fans 76,78 and the evaporative cooling devices 96 associated with the switches 224 and 226 turn on can be staggered such that not all of the tunnel fans 76,78 and evaporative cooling devices 96 turn on simultaneously. This significantly eases the load on the power utility since motor driven devices typically consume several times their operating current during start up. This also lends to more cost efficient operation of the facility 12.

Referring now to FIG. 10, the auxiliary stage transition control section 146 will be described. This section comprises two auxiliary mode control selector switches 228 and 230 for controlling two or more auxiliary cooling devices. In the preferred embodiments it is contemplated that the auxiliary mode control switches 228 and 230 are contemplated to control two or more fans such as stir fans 84. Each of the mode control switches 228 and 230 are further associated with particular ones of the relays 112a (FIG. 2) capable of handling the current flow drawn by a two horsepower motor. Since the optional stir fans 84 shown in FIG. 1 each preferably comprise about a ½ horsepower motor, two of the fans 84 can easily be controlled via the mode control switch 228 while the other two are controlled by the switch 230.

Since the mode control selector switches 228 and 230 are identical in function, only the function of the switch 228 will be described. The switch 228 includes indicia 232 denoting the POWER mode of operation, the NATURAL mode of operation, and a mode "PWR/NAT.". In addition, an "OFF" position and an "ON" position are defined. Each of the POWER, NATURAL and PWR/NAT. sections include sub-positions defined by numerals "1", "2" and "3" which correspond to stage temperatures 1, 2 and 3 defined by the user. In addition, the NATURAL section includes a fourth position corresponding to stage temperature 4 defined by the user.

When the selector switch 228 is positioned at any of the three stage temperature indications in the POWER section, the stir fans 84 associated with the control switch 228 are turned on at the specific stage (i.e., stage temperature 1, 2 or 3) at which the switch 228 points. When the switch 228 is rotated to any one of the four stage designations in the NATURAL section, the stir fans 84 associated with the switch 228 are only turned on when the controller system 100 is in the NATURAL mode of operation, and then only when the chosen stage is reached. When the switch 228 is rotated to the PWR/NAT. position, then the stir fans 84 controlled by the switch 228 are turned on, and remain turned on, in both the POWER and NATURAL modes when the designated stage is reached. If the switch 228 is rotated to the OFF position, the stir fans 84 controlled by the switch 228 will be maintained off no matter what mode the controller system 100 is operating in. Conversely, if the switch 228 is rotated to the ON position, the stir fans 84 controlled by the switch 228 will be turned on continuously. An optional LED indicator 234 provides an even more conspicuous visual indication that the fans 84 associated with the switch 228 are set to run continuously.

Thus, by the indicia 232 and the control switch 228, a plurality of cooling devices can be controlled in a plurality of operational modes and caused to be turned on at a specific temperature stage. Still further, the user is afforded the capability of manually controlling the stir fans 84 by the mode control switches 228 and 230. It will be appreciated that the controller system 100 automatically shuts off all of the fans controlled by the mode control switches 228 and 230 as soon as the tunnel mode is entered. Also, while the auxiliary mode control switches 228 and 230 have been described as controlling the stir fans 84, it will be appreciated that these controls could be used in connection with other devices such as evaporative cooling pads, additional motor-driven curtains, etc. as dictated by the needs of a particular application.

Referring now to FIG. 11, the power/natural cooling stage control section 150 will be described. This section 150 includes four independent mode control switches 236, 238, 240 and 242. The switches 236–242, in the preferred embodiments, are associated with the side wall exhaust fans 64–70, respectively. Accordingly, independent control over each one of the side wall exhaust fans 64–70 is provided to the user.

Since each of the mode control switches 236–242 are identical in operation, only the operation of the switch 236 will be described. The switch 236 includes indicia 244 which defines a "POWER" section and a "POWER/NAT" section. An "OFF" designation defines an off position and an ON designation defines an on position. An optional LED 246 provides a more conspicuous visual indication when the switch 236 is turned to the ON position. The POWER and POWER/NAT section each include numerals "1"–"5" denoting stages 1–5 defined by the user.

When the mode control switch 236 is pointed to any one of the five stages in the POWER section, then an associated one of the side wall exhaust fans 64–70, for example, fan 64, is turned on when the selected stage is reached when the controller system 100 is operating in the POWER mode. If the switch 236 is pointed to any one of the five stages in the POWER/NAT section, the side wall exhaust fan 64 is turned on in both the POWER and the NATURAL operating modes when the particular stage at which the switch 236 is pointing is reached. When the switch 236 is moved to the OFF position, the side wall exhaust fan 64 will be turned off and will remain off regardless of the stage temperature within the poultry house 12. If the switch 236 is moved to the ON position, then the side wall exhaust fan 64 will be turned on continuously. As soon as the TUNNEL mode is entered, however, the side wall exhaust fan 64 will be automatically turned off.

Accordingly, the mode control selection switches 236–242 each provide independent control over the side wall exhaust fans 64–70, as well as allowing each of the fans 64–70 to be controlled in either the POWER mode or a combination of the POWER and NATURAL modes. Advantageously, the user is provided with an instant visual indication as to how each one of the fans 64–70 is programmed to operate without having to manipulate a keyboard, keypad, or scroll through a menu-driven software system. The switches 236–242 provide the further significant advantage of instantly visually apprising the user if any one of the side wall exhaust fans 64–70 is set to remain continuously on or is turned off.

While it will be appreciated that the various parameters which the user defines such as the SET POINT temperature, stage temperatures, timer ON and OFF times, etc. will vary widely in accordance with many variables such as the size of the facility 12, the number of animals housed therein, the type of animals, the age of the animals, as well as the climate of the geographic region. An exemplary list of temperature and stage selections might be as follows.

The set point temperature will typically be a temperature in the low 70° fahrenheit range, such as about 72° F. Stages 1–10 would typically be represented by 2° F. temperature increases. Thus, stage 1 might correspond to 74° F., stage 2 to 76° F., stage 2 to 78° F. and so forth. Stage H1 might typically be set to about 70° F. and stage H2 to about 68° F. Below stage 1, the side wall exhaust fans 64–70 associated with the selection switches 236–242 (FIG. 8) are controlled by the stage 1 timer to cycle in accordance with the user defined ON and OFF times. This provides a minimum level of ventilation for controlling humidity and ammonia levels within the facility 12. In addition, the stir fans 84 controlled by the mode control selector switches 228 and 230 (FIG. 10) could optionally be set to run continuously to further help provide a minimum level of ventilation. The cycle times of the stage 1 timer and the auxiliary stage 1 timer may also vary widely but are typically set to provide five minute operating cycles comprising one minute of on time and four minutes of off time.

The transition point between the POWER and NATURAL modes, as well as the transition point between the NATURAL and the TUNNEL mode, may also vary widely. However, a typical Power-to-Natural transition stage might be defined as stage 4, where stage 4 has been defined by the user to represent a temperature of about 80° F. The tunnel mode might typically be programmed by the user to be entered at stage 7, which would typically correspond to about 86° F. Of course, the just-mentioned temperatures and transition points could be significantly different depending upon the age of the animals housed within the facility 12 as well as the overall number of such animals. Again, the above parameters have been described merely as an example of those which might typically be employed to provide proper ventilation and temperature control within a structure such as a poultry house. It will be appreciated by those skilled in the art that turkeys are much less susceptible to wide temperature variations and much more tolerant of high heat conditions. Therefore, the above parameters would be modified accordingly if turkeys are to be housed within the facility 12. Still further, it will be appreciated that hogs and virtually any other animal sensitive to relatively low or high temperatures could also be housed within the structure described as the facility 12.

In the preferred embodiments of the present invention, the electronic controller system 100 provides a visual indication to the user when any one of the rotary switches discussed in connection with FIGS. 6–11 is not pointing directly at a valid setting (i.e., in between two switch positions). In this instance, the LED associated with the mis-positioned switch flashes to visually apprise the user that the switch has not been placed at a valid position. With the master selector switch 152 and the set adjustment switch 156, if either is mis-positioned one of the LEDs associated with the sensor selector switch 160, and preferably the LED associated with sensor #1 thereof, is flashed.

Referring now to FIG. 12, a block diagram of the major subsystems of the electronic controller system 100 is provided. The controller system 100 includes a microcontroller in the form of an 8-bit microprocessor 250 commercially available from the Microchip Corporation. The microprocessor 250 is configured to receive inputs from DIP switches disposed on the main circuit board assembly 110, which include a "temperature units" selection switch 252, a "curtain speed" input switch 254 and a "total sensors" input switch 256, which are each configured during installation of the system by qualified personnel, and thus not intended to be readily accessed by the user. The "temperature units" switch allows the installer to define whether celsius or fahrenheit temperature conventions will be employed with the system 100. The "curtain speed" selection switch allows the installer to set the curtain speed provided by the motors of the various curtains used with the facility 12. The "total sensors" input switch allows the installer to inform the microprocessor 250 of the total number of temperature sensors used.

With further reference to FIG. 12, the outputs from each of the temperature sensors 92a–92f and 93a,93b are output to a 10 bit analog-to-digital (A/D) converter 258. The A/D converter 258, as is well known in the art, generates a digital signal in accordance with the magnitude of the analog signal input thereto, which is applied to an input 260 of the microprocessor 250. Power is further supplied to the controller system 100 from a suitable AC power source 262 via the power supply 102. As stated earlier, the power supply provides a regulated +12 volts dc.

The system 100 further includes an electrically erasable, programmable, read-only memory (EEPROM) 264 for storing program code for operating the microprocessor 250. It will be appreciated that the EEPROM 264 could also be used to store variables input to the microprocessor 250 via the switch inputs 252, 254 and 256 if desired.

With further reference to FIG. 12, the microprocessor 250 provides output drive signals to a first serial input LED driver circuit 266, a second serial input LED driver circuit 268 and a display driver circuit 270. The first driver circuit 266 provides appropriate drive signals for driving the LEDs 174 described in connection with FIG. 7. The second driver circuit 268 generates a suitable drive signal for the LEDs associated with the various rotary control switches described in connection with FIGS. 7–11. The third driver circuit 270 provides a suitable electrical drive signal for driving the four segment LED display 158 shown in FIG. 7.

A fourth serial input LED driver 272 is included for providing suitable drive signals to a plurality of relay coil driver circuits 274. The relay coil driver circuits 274, in turn, generate a plurality of suitable output signals for controlling operation of the output relays 112a (FIG. 5). The output relays 112a, in turn, control on and off operation of the various heating and cooling devices associated with the facility 12. It will be appreciated that each one of the relays 112a is associated with a respective one of the switches discussed in connection with FIGS. 6–11. Thus, each one of the relays 112a is controlled independently by the switches of FIGS. 6–11 and the controller system 100.

With further reference to FIG. 12, it will be noted that a plurality of limit switches 276 are associated with the operation of the tunnel curtains 36,50. Similarly, independent pluralities of limit switches 278 and 280 are associated with the side wall curtains Group A (curtains 38, 40 and 42) and Group B (curtains 52 and 54), respectively. The plurality of limit switches 276 typically comprises a lower limit switch and an upper limit switch which provide indications that the tunnel curtains have each reached either a completely closed position or a completely open position. The pluralities of limit switches 278 and 280 also typically comprise at least a pair of limit switches for informing the microprocessor 250 when each group of side wall curtains 38-42 and 52,54 is completely lowered or completely raised.

The electronic controller system 100 further includes the auxiliary stage #1 timer and the stage #1 timer, designated by reference numerals 282 and 284, respectively, as indicated in phantom in FIG. 12. The timers 282 and 284 are preferably implemented in software for the microprocessor 250. It will be appreciated, however, that these timers could just as easily be implemented by the use of appropriate hardware timers.

The preferred methods and apparatus of the present invention further contemplate that the opening of the side wall curtains be performed in accordance with the degree of variation in the temperature within the facility 12 from the SET POINT temperature defined by the user, when in the NATURAL mode. Preferably, when the sensed temperature within the facility 12 differs by about 8° F. or more from the SET POINT temperature, the controller system 100 causes the side wall curtains 38-42 and 52,54 to be driven continuously to their fully open positions. When the temperature difference is only slight, for example about 1° F., then the controller system 100 causes the side wall curtains 38-42 and 52,54 to be driven (i.e., opened) intermittently, and more preferably about six inches every five minutes. A curtain controller commercially available at the present time which provides this degree of control is available from the assignee of the present invention.

Figure 13:
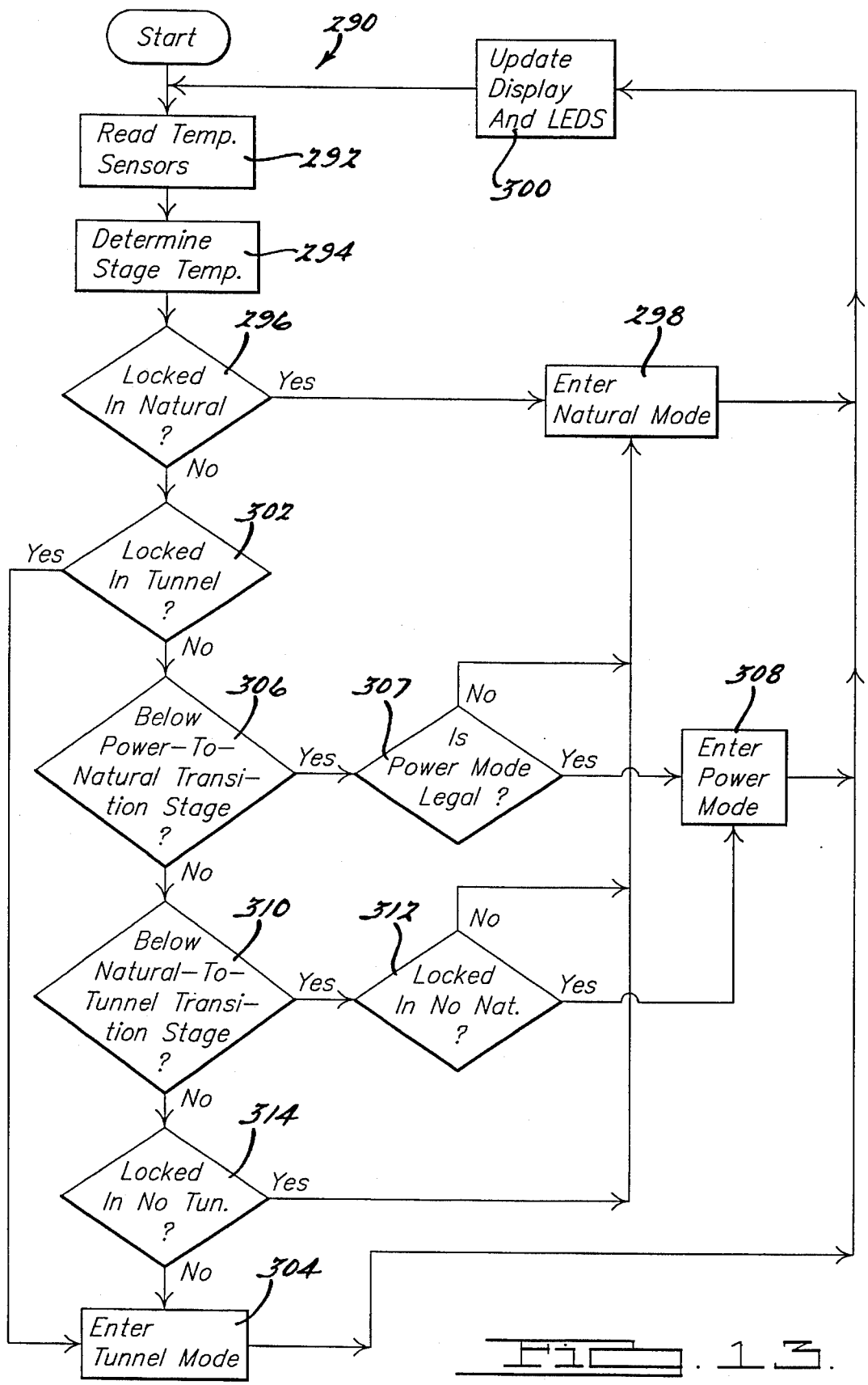
FIG. 13 is a simplified flowchart of the basic steps performed by the control system in controlling the temperature within a facility such as a poultry house.

Referring now to FIG. 13, a flow chart 290 in accordance with the preferred embodiments and methods of the present invention is illustrated to show the steps taken by the controller system 100 in controlling the various heating and cooling devices of the facility 12. The first step performed by the controller system 100 is to read the outputs of each of the temperature sensors 92a–92f, as indicated at step 292. Next, the controller system 100 determines the user-defined stage temperature which is present within the facility 12, as indicated at step 294. The electronic controller system 100 then checks to determine if the user has commanded operation to be locked in the NATURAL mode, as indicated at step 296. If operation is to be locked in the NATURAL mode, then the NATURAL mode is entered, as indicated at step 298. The electronic controller system 100 implements the NATURAL mode by turning on any of the stir fans 84 which have been set via the switches 228 and 230 (FIG. 10) to turn on in either the NATURAL mode or the POWER/NAT mode, provided the selected temperature stage has been reached or exceeded within the facility 12. Additionally, the optional heaters 88 and 90 are turned off and the side wall curtains 38-42 and 52,54 are opened at least slightly depending upon the temperature differential between the stage temperature within the facility 12 and the SET POINT temperature programmed by the user. Subsequently, the display 158 (FIG. 7) is updated together with the LEDs 202 and 204 associated with the switches 194 and 196, respectively (FIG. 8), as indicated at step 300.

If the system has not been locked in the NATURAL mode, as indicated at step 296, a check in made to determine if the user has locked the system 100 in the TUNNEL mode, as indicated at step 302. If so, the TUNNEL mode is entered as indicated at step 304. In the TUNNEL mode the side wall curtains 38–42 and 52,54 are closed, the optional stir fans 84 are turned off, the optional heaters 88 and 90 are turned off and the side wall exhaust fans 64–70 are turned off. The TUNNEL curtains 36,50 are opened and the TUNNEL fans 76,78 are turned on. If the evaporative cooling system 94 is included, then this system is also turned on in the TUNNEL mode. It will be appreciated, however, that the evaporative cooling system could be run in the other operating modes if the user has placed the switches 224 and 226 (FIG. 9) in the "ON" positions. Subsequently, the display 158 is again updated to indicate the current stage temperature, the LED 202 is extinguished and the LED 206 is eliminated (FIG. 8), as indicated at step 300.

If the operator has not locked the controller system 100 in the TUNNEL mode, as indicated at step 302, then the system 100 checks to determine if the stage temperature which was determined at step 294 is below the Power-to-Natural transition stage defined by the user, as indicated at step 306. If so, a "power mode legal" check is made at step 307 to determine if proper conditions exist to enter the POWER mode. By proper conditions, it is meant that the side wall curtains 38–42 and 52,54 must be closed. If this condition is not present, then the system 100 causes the NATURAL mode to be entered, as at step 298. If the test at step 307 is met, however, then the controller system 100 causes the POWER mode to be entered, as indicated at step 308. In the POWER mode the electronic controller system 100 turns on any of the stir fans 84, heaters 88,90 and side wall exhaust fans 64–70 which have been set by the user to turn on provided the stage temperature selected for each such device has been reached within the facility 12. The display 158 is then updated and the LED 200 (FIG. 8) is illuminated, as indicated at step 300.

If the test at step 306 proves false, then the electronic controller system 100 checks to determine if the stage temperature at which the Natural-to-Tunnel mode transition stage has been reached, as indicated at step 310. If so, check is made to determine if the user has "locked out" the NATURAL operating mode via the switch 194 (FIG. 8), as indicated at step 312. If this test proves true, then the system 100 enters, or remains in, the POWER mode, as indicated at step 308. If the user has not locked out the NATURAL mode, then the NATURAL mode is entered at step 298. If the test at step 310 proves false, then a check is made to determine if the user has locked out the TUNNEL mode of operation via the switch 196 (FIG. 8), as indicated at step 314. If so, then the system 100 enters, or continues to run in, the NATURAL mode. If the TUNNEL mode has not been locked out, then the TUNNEL mode of operation is entered as indicated at step 304. In either event the display 158 is subsequently updated to reflect the current stage temperature within the facility 12. If a transition has been made from the NATURAL mode to the TUNNEL mode, then the LED 204 (FIG. 8) is extinguished and the LED 206 is illuminated. In this regard it will be appreciated that the individual LEDs associated with the rotary switches discussed in connection with FIGS. 6–11 each are illuminated when the device associated with it is operating.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed:

1. A facility for use in housing animals, said facility comprising:

a structure for defining the inside of said facility;

means for regulating the temperature of the air within said structure, said means for regulating the temperature of the air within said structure including:
  a) a first plurality of fans which are operable to direct the air inside said structure in a first direction, and
  b) a second plurality of fans which are operable to direct the air in a second direction within said structure; and means for controlling the operation of said means for regulating the temperature of the air within said structure, said means for controlling including:
  a) a case defined in part by a cover,
  b) a microprocessor disposed within said case which is operable to control the operation of said first and second plurality of fans,
  c) a first plurality of switches visible from the exterior of said case, said first plurality of switches electrically communicating with said microprocessor and being operable to control said first plurality of fans,
  d) a second plurality of switches visible from the exterior of said case, said second plurality of switches electrically communicating with said microprocessor and being operable to control said second plurality of fans, and
  e) means for continuously indicating the position of each of said switches;

whereby the temperature of said air within said structure may be controlled.

2. The facility of claim 1, further comprising:

a third plurality of switches visible from said exterior of said case, said third plurality of switches electrically communicating with said microprocessor and being operable to control a third plurality of fans independently of said first and second pluralities of fans.

3. The facility of claim 1, wherein said means for controlling the operation of said means for regulating the temperature of the air within said structure further comprises:

at least one switch visible from said exterior of said case and electrically communicating with said microprocessor for controlling operation of at least one curtain associated with said structure.

4. The facility of claim 1, wherein said means for controlling the operation of said means for regulating the temperature of the air within said structure further comprises:

at least one switch visible from said exterior of said case and electrically communicating with said microprocessor for controlling the operation of at least one heater disposed within said facility.

5. The facility of claim 1, wherein said means for controlling the operation of said means for regulating the temperature of the air within said structure further comprises:

switch means visible from said exterior of said case for enabling a user to define a plurality of stage temperatures at which said first and second pluralities of fans are to turn on.

6. The facility of claim 5, wherein said switch means further comprises a mode selection switch visible from said exterior of said case and electrically communicating with said microprocessor for enabling said user to select one of a plurality of operational parameters to be programmed by said user.

7. The facility of claim 6, further comprising:
 a plurality of temperature sensors disposed within said facility and in electrical communication with said microprocessor;
 a temperature sensor selector switch visible from said exterior of said case and electrically communicating with said microprocessor for enabling said user to select any one of said plurality of temperature sensors to be read; and
 display means in electrical communication with said microprocessor and visible when viewing said cover of said case for providing a visual indication of a temperature sensed by said temperature sensor selected by said user via said temperature sensor selector switch.

8. The facility of claim 1, wherein said means for controlling the operation of said means for regulating the temperature of the air within said structure further comprises:
 a first mode transition switch in electrical communication with said microprocessor and being visible from said exterior of said case for enabling said user to manually select a temperature level within said structure at which a transition occurs from a first cooling mode of operation to a second cooling mode of operation; and
 a second mode transition switch in electrical communication with said microprocessor and being visible from said exterior of said case for enabling said user to manually select a temperature level within said structure at which said second cooling mode of operation is exited and a third cooling mode of operation is entered.

9. The facility of claim 1, wherein said means for controlling the operation of said means for regulating the temperature of the air within the structure further comprises:
 a stage temperature in electrical communication with said microprocessor for defining a plurality of stage temperatures;
 an adjustment switch for enabling a user to select a temperature level for each one of said stage temperatures; and
 display means for providing a visual display of said temperature level as said adjustment switch is manipulated by said user.

10. A facility for use in housing animals and providing a well ventilated and temperature controlled climate for said animals, said facility comprising:
 a structure for defining an inside of said facility, said structure including:
  a first side wall having at least one opening and a second side wall having at least one opening;
  first curtain means for controllably covering said at least one opening in said first side wall;
  a first fan disposed in said at least one opening in said second side wall for exhausting air from said inside of said facility;
  a first end wall and a second end wall;
  a second opening disposed in one of said first side wall, said second side wall or said second end wall;
  second curtain means disposed over said second opening for controllably covering said second opening;
  a third opening disposed in one of said first side wall, said second side wall or said end wall so as to be at an opposite longitudinal end of said facility from said second opening;
 temperature sensing means disposed within said facility for sensing a temperature within said facility and generating a corresponding electrical output indicative of said sensed temperature;
 a second fan for generating a cooling air flow longitudinally along substantially an entire length of said inside of said facility;
 controller means for controlling operation of said first curtain means, said second curtain means, said first fan and said second fan, said controller means being responsive to said temperature sensing means and including:
  an enclosure defined in part by a front panel;
  a microprocessor disposed within said enclosure in electrical communication with said first curtain means, said second curtain means, said first fan and said second fan, said microprocessor providing a first cooling mode of operation in which said first fan is turned on while said first and second curtain means are each closed and said second fan is turned off to thereby provide a minimum degree of ventilation of said facility, a second mode of operation in which said first fan is turned on, said first curtain means is opened and said second fan is turned off to thereby enable natural cross ventilation of said facility, and a third cooling mode of operation in which said first curtain means is closed, said first fan is turned off, said second curtain means is opened and said second fan is turned on to thereby cause a cooling air flow to be generated through substantially an entire longitudinal length of said inside of said facility which provides a wind-chill like cooling effect, to thereby help cool said animals housed within said facility;
  at least one manually engageable switch on said front panel in electrical communication with said microprocessor for enabling a user to define at least a first stage temperature and a second stage temperature;
  a first mode transition switch in electrical communication with said microprocessor accessible from said front panel for enabling said user to select at which one of said user-defined stage temperatures said first cooling mode of operation is to be exited and said second cooling mode of operation is to be entered; and
  a second mode transition switch manually accessible from said front panel and in electrical communication with said microprocessor for enabling said user to select at which one of said user-defined stage temperatures said second cooling mode of operation is to be exited and said third cooling mode of operation is to be entered.

11. The facility of claim 10, wherein said front panel of said control means further comprises indicia associated with said first mode transition switch for providing an immediate visual indication to said user of said stage temperature at which said user has defined that said first cooling mode of operation is to be exited and said second cooling mode of operation is to be entered.

12. The facility of claim 10, further comprising:
 a fan control switch in electrical communication with said microprocessor and being manually and visually accessible from said front panel for enabling said user to independently preselect one of said stage temperatures at which said second fan is to turn on; and
 indicia associated with said fan control switch for independently controlling said second fan for providing a continuous visual indication to said user indicative of said stage temperature at which said second fan has been preselected by said user to turn on.

13. The facility of claim 12, wherein said fan control switch for independently controlling said second fan includes a position for enabling said user to set said second fan for continuously on operation; and a position for enabling said user to disable said second fan such that said second fan is not turned on when said third mode of operation is entered.

14. The facility of claim 12, wherein said first and second mode transition switches include means for visually indicating which one of said first, second and third cooling modes of operation is currently being implemented by said microprocessor.

15. The facility of claim 10, further comprising a manually engageable curtain means control switch in electrical communication with said microprocessor and manually accessible by said user from said front panel for enabling said user to preselect one of a plurality of operational modes of operation for said first curtain means including:

an automatic mode of operation in which said first curtain means is controlled automatically by said microprocessor to open and close in accordance with said first, second and third cooling modes of operation;

a continuously open mode of operation in which said first curtain means is opened to allow ambient air to enter said inside of said facility and is locked in said opened position;

a closed mode of operation in which said first curtain means is closed and remains in a closed position blocking air flow through said first side wall into said inside of said facility regardless of which one of said first, second and third cooling modes of operation is implemented by said controller means.

16. The facility of claim 10, further comprising:

a second curtain control switch manually accessible from said front panel by said user and in electrical communication with said microprocessor for enabling said user to preselect a plurality of operational modes of said second curtain means including:

an automatic mode of operation in which said second curtain means is responsive to said microprocessor and is caused to open and close in accordance with said first, second and third cooling modes of operation as implemented by said microprocessor;

an open mode of operation in which said second curtain means is caused to be opened and locked in an open position regardless of said first, second and third cooling modes of operation implemented by said controller means; and a closed mode of operation in which said second curtain means is caused to be closed and is disabled regardless of said first, second and third cooling modes of operation implemented by said microprocessor.

17. The facility of claim 10, further comprising an independent first fan control switch manually accessible by said user from said front panel and in electrical communication with said microprocessor for enabling said user to program said first fan to be turned on at a selected one of said user-defined stage temperatures when said controller system is operating in said first cooling mode of operation, and for enabling said user to program at which one of said user predefined stage temperatures said first fan is to turn on when said controller system is operating in either said first or second cooling modes of operation.

18. The facility of claim 10, wherein said controller means includes display means for providing an immediate, continuous visual indication to said user when viewing said front panel of which stage temperature has been reached within said facility.

19. The facility of claim 10, wherein said controller means includes a numerical display visible when viewing said front panel for providing said user with a visual indication of said temperature sensed within said structure by said temperature sensing means.

20. The facility of claim 10, wherein said facility further comprises an auxiliary ventilation fan disposed within said facility; and wherein said controller means includes an auxiliary fan control switch visible and manually accessible from said front panel for enabling said user to define at which one of said preselected stage temperatures said auxiliary ventilation fan is to be turned on.

21. The facility of claim 20, wherein said auxiliary fan control switch for enabling said user to select at which one of said predefined stage temperatures said auxiliary ventilation fan is to be turned on further enables said user to program said auxiliary ventilation fan to turn on at a user selected one of said stage temperatures only while said microprocessor is implementing said first cooling mode, only while said microprocessor is implementing said second cooling mode, or when either said first or said second cooling modes of operation are being implemented by said microprocessor.

22. The facility of claim 21, further comprising:

indicia associated with said auxiliary fan control switch for providing a continuous visual indication of which one of said cooling modes of operation said auxiliary ventilation fan is programmed to turn on; and for providing a visible indication of said stage temperature at which said auxiliary ventilation fan is to turn on at.

23. The facility of claim 20, wherein said auxiliary fan control switch for controlling said auxiliary ventilation fan includes a position for enabling said user to turn on said auxiliary ventilation fan for continuous use such that said auxiliary ventilation fan is not affected by transitions between said first, second and third cooling modes of operation; and wherein said auxiliary fan control switch enables said operator to disable operation of said auxiliary ventilation fan such that said auxiliary ventilation fan does not respond to transitions between said first, second and third cooling modes of operation but remains continuously turned off.

24. The facility of claim 23, wherein said auxiliary fan control switch includes means for providing an immediate, continuous visual indication that said auxiliary ventilation fan has been set to turn on and run continuously.

25. The facility of claim 10, further comprising:

heating means for providing heat to said inside of said facility;

said controller means further including a heater control switch in electrical communication with said microprocessor and manually accessible from said front panel for enabling a user to select a stage temperature at which said heating means is to turn on, to cause said heater means to be continuously disabled, and for causing said heating means to be turned on continuously; and indicia associated with said heater control switch for providing an immediate visual indication to said user as to whether said heater control switch has been set to cause automatic control over said heating means by said microprocessor, to cause said heating means to be continuously turned off, or to cause said heating means to be turned on for continuous operation.

26. A method for controlling ventilation and temperature within a facility for housing animals, wherein said facility includes first and second side walls and first and second end walls, said first side wall having an opening with a controllably openable and closable curtain disposed thereover, said second side wall having an opening with a first fan disposed therein, one of said side walls or one of said end walls having another opening over which a second controllably openable and closable curtain is disposed, and one of said side walls or said first end wall having an opening in which is disposed a second fan for generating a longitudinal air flow through substantially an entire length of an inside of said facility when said second curtain is opened, said method comprising the steps of:

using an electronic controller system having at least one manually engageable switch readily manually and visually accessible by a user to define a plurality of preselected temperature levels within said facility;

using at least one mode transition switch manually and visually accessible by said user for enabling said user to manually access one of said preselected temperature levels at which said at least one mode transition switch switches from a first cooling mode of operation to a second mode of operation, and from said second cooling mode of operation to a third cooling mode of operation;

using indicia with said at least one mode transition switch to provide an immediate visual indication as to the temperature level within said facility.

27. The method of claim 26 further comprising the steps of:

sensing a temperature within said facility; and providing a visual indication of said temperature level within said facility, which indication is immediately visually readable by said user.

28. The method of claim 26, further comprising the step of using an independent, manually engageable switch for enabling said user to readily manually select one of said preselected temperature levels at which said first fan is to turn on.

29. The method of claim 26, further comprising the step of using an independent, readily accessible switch to enable said user to program said first curtain to be controlled automatically by said electronic controller system, or to be controlled manually by said user; and using indicia adjacent said independent switch to provide a readily visually apparent indication of how said first curtain has been set by said user to operate.

30. The method of claim 26, further comprising the step of using an independent, readily manually accessible switch to enable said user to select one of said preselected temperature levels at which said second fan is to turn on.

31. For a facility for use in housing animals, said facility having a first side wall having an opening over which a first electronically controllable curtain member is disposed, a second side wall having an opening in which a side wall fan is disposed, a temperature sensor disposed within said facility, an electronic controller system for controlling said curtain member and said side wall fan in accordance with at least first and second cooling modes of operation, said electronic controller system comprising:

an enclosure having a front panel;

a microprocessor disposed within said enclosure;

a plurality of independent relays electrically responsive to said microprocessor for controlling said curtain member and said side wall fan;

a stage temperature selection switch readily manually and visually accessible by a user from said front panel and in electrical communication with said microprocessor for enabling said user to define a plurality of stage temperatures;

a stage temperature set switch in electrical communication with said microprocessor and readily accessible from said front panel for enabling said user to define a precise temperature level for each one of said stage temperatures;

a first mode transition selection switch readily manually accessible by said user from said front panel for enabling said user to select one of said stage temperatures at which a transition is to be made by said electronic controller system from said first cooling mode wherein a minimal degree of ventilation is provided to said facility by said side wall fan, to said second cooling mode of operation, wherein said curtain member is caused to be opened by said electronic controller system to permit natural cross ventilation of said facility.

32. The electronic controller system of claim 31, further comprising an independent, readily manually accessible side wall fan control switch for enabling said user to select one of said plurality of stage temperatures at which said side wall fan is to turn on, and for enabling said user to program whether said side wall fan is to turn on only in said first cooling mode, or in both said first and second cooling modes of operation.

33. The electronic controller system of claim 32, further comprising:

means for forming a timer for controlling on and off operation, in intermittent fashion, of said sidewall fan when said sidewall fan is programmed by said user to turn on at a pre-determined one of said temperature stages; and master selection switch means manually accessible from said front panel for enabling said user to program a duration of at least one of said on and off times of said timer means.

34. The electronic controller system of claim 31, further comprising first display means for providing an immediate, continuous visual indication of said stage temperature that has been reached within said facility.

35. The electronic controller system of claim 31, further comprising second display means for numerically displaying a temperature sensed by said temperature sensor within said facility.

36. The electronic controller system of claim 31, further comprising:

means for forming a timer for controlling on and off operation of said sidewall fan; and master selection switch means visually and manually accessible by said user for enabling said user to program said timer.

37. The electronic controller system of claim 36, wherein said master selection switch means further enables said user to define a high alarm temp; and wherein said electronic controller system includes means responsive to said high alarm temperature programmed by said user for providing a high temperature alarm indication visually readable from said front panel.

38. For a facility for use in housing animals such as poultry, said facility having a first side wall having an opening over which an electronically controlled sidewall curtain is disposed, a second side wall having an opening within which at least one side wall exhaust fan is disposed, first and second end walls, an opening in one of said side walls or said second end wall over which an electronically controllable tunnel curtain is disposed, and an opening in one of said side walls or said first end wall at an end of said facility opposite to that of said tunnel curtain within which at least one tunnel fan is disposed, an electronic controller system for providing control over ventilation and a temperature within said facility, said electronic controller system comprising:

an enclosure including a front panel;

a microprocessor disposed within said enclosure;

a plurality of relays electronically controlled by said microprocessor and associated with said side wall curtain, said tunnel curtain, said side wall exhaust fan and said tunnel fan;

a temperature stage selector switch readily manually and visually accessible from said front panel by a user and in electrical communication with said microprocessor for enabling said user to define a plurality of temperature stages;

a temperature adjustment set switch in electrical communication with said microprocessor and readily manually accessible by said user from said front panel for enabling said user to set a precise temperature level for each one of said stage temperatures;

a first mode transition selection switch readily manually accessible from said front panel and in electrical communication with said microprocessor for enabling said user to select one of said stage temperatures at which said electronic controller system causes a first cooling mode, in which said side wall exhaust fan is turned on and said side wall curtain is closed, to be exited, and a second cooling mode, in which said side wall curtain is opened, to be entered;

a second mode transition selection switch in electrical communication with said microprocessor and readily manually and visually accessible from said front panel for enabling said user to select one of said stage temperatures at which said second cooling mode is to be exited and a third cooling mode, in which said tunnel curtain is opened and said tunnel fan is turned on to induce an air flow longitudinally through said facility, is entered.

39. The electronic controller system of claim 38, further comprising indicia associated with each of said first and second mode transition selection switches to provide an immediate visual indication of a programmed state of each one of said mode transition selection switches.

40. The electronic controller system of claim 39, further comprising indicia associated with said independent side wall fan control switch for providing an immediate visual indication to said user as to said programmed state of operation of said side wall fan.

41. The electronic controller system of claim 40, further comprising indicia associated with said tunnel fan control switch for providing an immediate visual indication to said user as to the stage temperature at which said tunnel fan is to turn on when said third cooling mode of operation is entered.

42. The electronic controller system of claim 38, further comprising an independent tunnel fan control switch in electrical communication with said microprocessor and readily manually and visually accessible from said front panel for enabling said user to define one of said plurality of temperature stages at which said tunnel fan is to turn on when said third cooling mode of operation is entered.

43. The electronic controller system of claim 38, further comprising an independent side wall fan control switch in electrical communication with said microprocessor and readily manually and visually accessible by said user from said front panel for enabling said user to select at which one of a plurality of said stage temperatures said side wall fan is to turn on during said first cooling mode of operation, and for enabling said user to select at which one of said plurality of said stage temperatures said side wall fan is to turn on in either said first or second cooling modes of operation.

44. The electronic controller system of claim 38, further comprising display means for providing a visual indication as to which one of said stage temperatures has been reached within said facility.

45. The electronic controller system of claim 38, further comprising:

an auxiliary fan control switch in electrical communication with said microprocessor and being readily manually accessible from said front panel for enabling said user to select one of said plurality of stage temperatures at which a supplemental ventilation fan disposed within said facility turns on when said electronic controller system is implementing said first cooling mode of operation, and for enabling said user to select one of said plurality of stage temperatures at which said supplemental ventilation fan turns on when said electronic controller system is implementing said second cooling mode of operation, and for enabling said user to command that said minimum ventilation fan turn on at one of said plurality of stage temperatures when said electronic controller system is implementing either one of said first and second cooling modes of operation.

* * * * *

UNITED STATES PATENT AND TRADEMARK OFFICE
CERTIFICATE OF CORRECTION

PATENT NO. : 5,492,082
DATED : February 20, 1996
INVENTOR(S) : Krevinghaus et al.

It is certified that error appears in the above-identified patent and that said Letters Patent is hereby corrected as shown below:

Column 10, Line 28, "4" should be --4-- (not bold type).

Column 16, Line 36, "readdusted" should be --readjusted--.

Column 16, Line 41, "or" should be --of--.

Column 17, Line 6, "She" should be --The--.

Column 18, Line 58, "heather" should be --heater--.

Column 19, Line 12, insert "to" after --are--

Column 24, line 24, "2" should be --3--.

Column 27, Line 2, "in" should be --is--.

Signed and Sealed this

Sixteenth Day of June, 1998

Attest:

BRUCE LEHMAN

*Attesting Officer*     *Commissioner of Patents and Trademarks*